US012801837B2

(12) United States Patent
Nahum et al.

(10) Patent No.: US 12,801,837 B2
(45) Date of Patent: Nov. 17, 2026

(54) DEFINING WIDGETS AND EXECUTING THEM OVER AN APPLICATION

(71) Applicant: WalkMe Ltd., Tel Aviv (IL)

(72) Inventors: Nir Nahum, Tel Aviv (IL); Ron Zohar, Givatay'im (IL); Moran Shemer, Ra'anana (IL)

(73) Assignee: WalkMe Ltd., Tel Aviv (IL)

( * ) Notice: Subject to any disclaimer, the term of this patent is extended or adjusted under 35 U.S.C. 154(b) by 300 days.

(21) Appl. No.: 18/661,229

(22) Filed: May 10, 2024

(65) Prior Publication Data

US 2025/0348657 A1 Nov. 13, 2025

(51) Int. Cl.
*G06F 40/166* (2020.01)
*G06F 9/451* (2018.01)

(52) U.S. Cl.
CPC ............ *G06F 40/166* (2020.01); *G06F 9/451* (2018.02)

(58) Field of Classification Search
CPC ............................... G06F 40/166; G06F 9/451
See application file for complete search history.

(56) References Cited

U.S. PATENT DOCUMENTS 11,086,959 B2 * 8/2021 Coimbra ................. G10L 15/22
11,960,864 B2 * 4/2024 Kaliyaperumal .... G06V 10/235
11,966,724 B1 * 4/2024 Srivastava ................ G06F 8/41
12,026,648 B2 * 7/2024 Sabo ................ G06Q 10/06316
12,073,180 B2 * 8/2024 Tunstall-Pedoe ..... G06F 40/279
12,499,417 B2 * 12/2025 Lu ........................... G06F 9/451
12,639,085 B1 * 5/2026 Thukkaram ............. G06F 9/451
2018/0129648 A1 * 5/2018 Chakravarthy ......... G06F 40/58
2021/0342785 A1 * 11/2021 Mann ....................... G06F 40/18
2022/0391458 A1 * 12/2022 Felt ......................... H04L 67/02
2023/0107233 A1 4/2023 Ripa et al.
2023/0333827 A1 10/2023 Gorroño et al.
2024/0045780 A1 2/2024 Aziz et al.
2024/0345573 A1 * 10/2024 Goyal ................ G05B 23/0281
2025/0005263 A1 * 1/2025 Mansour ............... G06F 40/134
2025/0007870 A1 * 1/2025 Kim .................... G06F 16/2455
2025/0036884 A1 * 1/2025 Walter .................. G06F 40/106
2025/0138850 A1 * 5/2025 Kwon ...................... G10L 15/22
2025/0199777 A1 * 6/2025 Grigore ..................... G06F 8/33

(Continued)

OTHER PUBLICATIONS

International Search Report with written opinion issued by the Israel Patent Office for International Patent Application No. PCT/IL2025/050383, dated Jul. 24, 2025.

(Continued)

*Primary Examiner* — Tadesse Hailu
(74) *Attorney, Agent, or Firm* — Myers Wolin, LLC

(57) ABSTRACT

A method, system and product comprising: defining an identification event associated with a Graphical User Interface (GUI) of a page of a third-party application; defining source data associated to an automation process; defining that, in response to identifying the identification event, an indication of the automation process is configured to be presented over the GUI; defining that, in response to identifying a trigger event, the automation process is configured to be executed by generating a prompt to a Large Language Model (LLM) engine, the prompt comprises a predefined structure of a text portion and a variable portion that is replaced with the source data every invocation of the trigger event; and defining a configuration for presenting in the GUI a result.

24 Claims, 12 Drawing Sheets

(56) References Cited

U.S. PATENT DOCUMENTS

| | | | | |
|---|---|---|---|---|
| 2025/0209297 | A1* | 6/2025 | Reid | G06N 3/006 |
| 2025/0217371 | A1* | 7/2025 | Hamid | G06F 40/174 |
| 2025/0217769 | A1* | 7/2025 | Kumar | G06F 16/332 |
| 2025/0238433 | A1* | 7/2025 | Sussman | G06Q 10/10 |
| 2025/0252121 | A1* | 8/2025 | Sulser | G06F 16/3329 |
| 2025/0315458 | A1* | 10/2025 | Clancy | G06F 16/906 |

OTHER PUBLICATIONS

Bucur, Matei, "Exploring large language models and retrieval augmented generation for automated form filling", University of Twente, Jul. 7, 2023, Retrieved from the Internet: URL:http://essay.utwente.nl/96259/I/39TScIT_submission_ 124%20%282%29. pdf.

* cited by examiner

200

FIG. 3A
Case
My Computer keeps restarting
Follow
Edit
Feed
Details
Case Owner
Bob Booker
Status
Waiting on Customer
Case Number
00005554
Priority
Medium
Contact Name
Lauren Boyle
Contact Phone
(212) 842-5500
Type
Add/Remove Authorized User
Contact Email
lboyle@uog.com
Case Reason
Authorized Signer
Case Origin
Phone
Error Code
State
Subject
My Computer keeps restarting
340
Bad Customer Sentiment!
Description
I am writing this message with immense frustration and disappointment regarding the continuous issues with my computer. I have contacted your support team three times now, each time hoping for a resolution, but I am sorry to say that my problem remains unsolved. My computer keeps restarting spontaneously without any warning or error messages.
310
Summarize the ticket description
I implore you to escalate my case to your highest level of technical support to ensure that the necessary expertise is applied to resolve this matter permanently. I expect a prompt response and an assurance that my issue will be given the utmost attention it deserves. I have been a loyal customer for years, but this recent experience has left me questioning whether my trust in your company was misplaced. Please understand the severity of my situation and act accordingly.
320
Suggest solution
I sincerely hope this will be the last time I need to reach out before my computer is restored to full functionality.
Internal Comments
Back Office Notes
Date/Time Opened
7/23/2023 1:08 AM
Date/Time Closed
Web Email
Created By
Last Modified By
300

Suggested Solution:

• Check Hardware: Verify that all hardware components (RAM, CPU, GPU, power supply, etc) are property seated and connected.
• Inspect for any physical damage or loose connections that could be causing the issue.
• Run hardware diagnostics to identity any faulty components.
• Update Drivers and Operating System: Ensure that all drivers for essential hardware components are up-to-date.
• Check for and install the latest updates for the operating system.
• Scan for Malware: Perform a full system scan using reliable antivirus software lo check for malware or viruses that could be causing the restarts.
• Check for Overheating: Monitor the system temperature lo determine if overheating is triggering the restarts.
• Clean the internal components to remove dust and improve airflow.
• Consider replacing the thermal paste on the CPU if necessary.
• Disable Automatic Restart: Disable the automatic restart feature m the system settings to view any potential error messages that may be hidden during the restart .
• Check Event logs: Review the system event logs for any error messages or warnings that could provide insights into the cause of the restarts.
• Reset or Reinstall Operating System: If all else tails, consider resetting or reinstalling the operating system to eliminate software related issues.
• Escalate to Specialized Support: As the issue has not been resolved with previous interactions, escalate the case to a higher level of technical support with specialized expertise.
• Offer Temporary Replacement: While the investigation is ongoing, offer the customer a temporary replacement computer to minimize disruption to their work and personal life.
• Regularly Update the Customer: Keep the customer informed about the progress of the investigation and any steps being taken to address the issue.
• Provide Compensation or Discount: Acknowledge the inconvenience caused to the customer and offer appropriate compensation or a discount on future services as a gesture of goodwill.

Thanks!

302

FIG. 3C

DEFINING WIDGETS AND EXECUTING THEM OVER AN APPLICATION

TECHNICAL FIELD

The present disclosure relates to digital tasks in general, and to generating an assisting layer for assisting users with digital tasks, in particular.

BACKGROUND

A digital adoption platform may be a comprehensive software platform designed to facilitate and streamline the adoption and usage of digital tools, applications, and software systems within organizations. It provides interactive guidance, contextual assistance, and personalized training to users, enabling them to navigate and effectively utilize complex software interfaces and functionalities. By offering real-time, step-by-step guidance and performance analytics, digital adoption platforms empower businesses to enhance user productivity, reduce training costs, and maximize return on investment in their digital initiatives.

Advancements in artificial intelligence and natural language processing have led to the development of sophisticated models capable of understanding, generating, and processing human language at an unprecedented scale. For example, a language model such as a Large Language Model (LLM) constitutes an advanced machine learning model trained on vast amounts of textual data, enabling it to comprehend and generate human-like text in a variety of languages. These models employ deep neural network architectures to learn patterns, semantics, and contextual information from textual inputs, enabling them to perform tasks such as language translation, text summarization, sentiment analysis, and even creative writing.

By leveraging their vast knowledge base and language proficiency, LLMs have the potential to revolutionize various fields, including content generation, customer support, language understanding, and information retrieval, among others. Their versatile capabilities make LLM an invaluable tool for businesses and researchers seeking to harness the power of natural language processing in their applications. Several notable examples of publicly available LLM products are ChatGPT™, BARD™ and BING™ Chat.

BRIEF SUMMARY

One exemplary embodiment of the disclosed subject matter is a method comprising: defining an identification event associated with a Graphical User Interface (GUI) of a page of a third-party application, the identification event indicates that a defined automation process is associated with text presented in the GUI; defining source data associated to the automation process, the source data comprising at least a portion of the text; defining that, in response to identifying the identification event, an indication of the automation process is configured to be presented over the GUI; defining that, in response to identifying a trigger event, the automation process is configured to be executed, wherein executing the automation process comprises generating a prompt to a Large Language Model (LLM) engine, wherein the prompt is configured to comprise a predefined structure of a text portion and a variable portion, wherein the variable portion is configured to be replaced with the source data every invocation of the trigger event; and defining a configuration for presenting in the GUI a result, wherein the result is based on an output from the LLM engine.

Optionally, the source data comprises text associated to an element that is displayed in the GUI, wherein the automation process is defined to correspond to the element.

Optionally, the source data comprises selected text that is displayed in the GUI, wherein the automation process corresponds to the selected text.

Optionally, the source data comprises all text that is displayed in the GUI, wherein the automation process corresponds to the text.

Optionally, the page includes one or more fields reflecting a submission of another user, wherein the prompt is generated to instruct the LLM engine to perform a text generation task configured to assist an end user with responding to the submission.

Optionally, the page includes one or more fields reflecting a submission of another user, wherein the prompt is configured to instruct the LLM engine to perform a text analysis task analyzing text of the submission, whereby providing an end user with insights useful to handle the submission by the another user.

Optionally, a second automation process is defined for the source data, and the method further comprises configuring a second indication of the second automation process to be presented over the GUI in response to the identification event.

Optionally, the method further comprises configuring a target location for presenting the indication of the automation process.

Optionally, the source data comprises text associated to an element that is displayed in the GUI, and the target location is adjacent to the element.

Optionally, the method further comprises configuring a target location for presenting the result.

Optionally, the method further comprises performing, in response to said identifying the trigger event, an automatic scroll of the page until reaching a displayed portion of the page that depicts the target location.

Optionally, the trigger event comprises a user interaction with the indication of the automation process.

Optionally, the indication of the automation process comprises a widget presenting a text string, wherein the text string describes the automation process, wherein the widget comprises a launcher or a tooltip, wherein the widget is not defined by the third-party application.

Optionally, the configuration of presenting the result comprises: updating one or more properties of the GUI based on the result; presenting the result in a textbox in the GUI, wherein the result is configured to be inserted into the textbox and displayed therein; presenting the result in the textbox, wherein the result is configured to be displayed by updating a visual characteristic of at least a portion of the textbox; presenting the result in a text input field, wherein the result is configured to be appended to pre-existing text in the text input field; presenting the result in the text input field, wherein the text input field is configured to be updated to present the result; presenting the result in a popup element, the popup element is configured to be displayed over the GUI, wherein the popup element is not part of the third-party application; presenting the result in a chat widget, wherein the chat widget is not part of the third-party application; or the like.

Optionally, wherein the one or more properties comprise at least one of: a color of a text element, a highlighting of a text element, and a color of a non-text element.

Optionally, the text portion of the prompt is set to comprise a background section describing a background of the automation process, and a command section comprising a request for processing the variable portion according to the automation process.

Optionally, the automation process is configured to be performed with respect to a content source, wherein the content source comprises a database or a repository, wherein the prompt to the LLM is determined based on at least a portion of retrieved data that is retrieved from the content source, wherein the retrieved data conforms to a similarity metric with respect to the source data or with respect to portion of the predefined structure of the text portion.

Optionally, said defining the identification and trigger events is performed in a digital adoption platform that is agnostic to the third-party application, wherein the digital adoption platform is configured to assist end users using the third-party application, wherein said defining the source data, said defining the indication, said defining that the automation process is configured to be executed, and said defining the configuration are all performed via the digital adoption platform.

Optionally, the method further comprises determining the identification event occurring in the third-party application, the third-party application is being used by an end user; presenting the indication of the automation process, wherein the indication of the automation process is presented over the GUI of the third-party application; in response to the trigger event: determining the source data; generating the prompt; providing the prompt to the LLM engine, whereby obtaining the result from the LLM engine; and presenting the result over the GUI of the third-party application according to the configuration.

Another exemplary embodiment of the disclosed subject matter is a computerized apparatus having a processor, the processor being adapted to perform the steps of: defining an identification event associated with a GUI of a page of a third-party application, the identification event indicates that a defined automation process is associated with text presented in the GUI; defining source data associated to the automation process, the source data comprising at least a portion of the text; defining that, in response to identifying the identification event, an indication of the automation process is configured to be presented over the GUI; defining that, in response to identifying a trigger event, the automation process is configured to be executed, wherein executing the automation process comprises generating a prompt to a LLM engine, wherein the prompt is configured to comprise a predefined structure of a text portion and a variable portion, wherein the variable portion is configured to be replaced with the source data every invocation of the trigger event; and defining a configuration for presenting in the GUI a result, wherein the result is based on an output from the LLM engine.

Yet another exemplary embodiment of the disclosed subject matter is a computer program product comprising a non-transitory computer readable storage medium retaining program instructions, which program instructions when read by a processor, cause the processor to perform: defining an identification event associated with a GUI of a page of a third-party application, the identification event indicates that a defined automation process is associated with text presented in the GUI; defining source data associated to the automation process, the source data comprising at least a portion of the text; defining that, in response to identifying the identification event, an indication of the automation process is configured to be presented over the GUI; defining that, in response to identifying a trigger event, the automation process is configured to be executed, wherein executing the automation process comprises generating a prompt to a LLM engine, wherein the prompt is configured to comprise a predefined structure of a text portion and a variable portion, wherein the variable portion is configured to be replaced with the source data every invocation of the trigger event; and defining a configuration for presenting in the GUI a result, wherein the result is based on an output from the LLM engine.

Yet another exemplary embodiment of the disclosed subject matter is a system comprising a processor and coupled memory, the processor being adapted to perform: defining an identification event associated with a GUI of a page of a third-party application, the identification event indicates that a defined automation process is associated with text presented in the GUI; defining source data associated to the automation process, the source data comprising at least a portion of the text; defining that, in response to identifying the identification event, an indication of the automation process is configured to be presented over the GUI; defining that, in response to identifying a trigger event, the automation process is configured to be executed, wherein executing the automation process comprises generating a prompt to a LLM engine, wherein the prompt is configured to comprise a predefined structure of a text portion and a variable portion, wherein the variable portion is configured to be replaced with the source data every invocation of the trigger event; and defining a configuration for presenting in the GUI a result, wherein the result is based on an output from the LLM engine.

Yet another exemplary embodiment of the disclosed subject matter is a method comprising: defining an event associated with a GUI of a page of a third-party application, the event indicates that a defined automation process is associated with text in the GUI; defining source data associated to the automation process, the source data comprising at least a portion of the text; defining that, in response to identifying the event, the automation process is configured to be executed, wherein executing the automation process comprises generating a prompt to a LLM engine, the prompt configured to cause the LLM engine to perform at least a portion the automation process and to provide an output, wherein the prompt is configured to comprise a predefined structure of a text portion and a variable portion, wherein the variable portion is configured to be replaced with the source data every invocation of the prompt; in response to determining that the output complied with one or more conditions, determining that an identification event is detected; defining that, in response to detecting the identification event, an indication of the output is configured to be presented over the GUI without any user interactions; and defining that, in response to identifying a user interaction with the indication, a second automation process is configured to be performed.

Yet another exemplary embodiment of the disclosed subject matter is a method comprising: assisting a user with performing an operation that is based on a semantic analysis of text, the text is presented in a GUI of a page of a third-party application, said assisting comprises: automatically detecting an occurrence of an identification event in the GUI, the identification event indicates that an automation process is associated with the text; automatically determining source data for the automation process from the text; in response to the identification event, presenting an indication of the automation process over the GUI; in response to identifying an interaction of the user with the indication of the automation process, identifying a trigger event, the trigger event invoking an execution of the automation process, wherein the execution of the automation process comprises generating a prompt to a LLM engine, the prompt comprises the source data, wherein the prompt has a predefined structure of a text portion and a variable portion, wherein said generating the prompt comprises replacing the variable portion with the source data; obtaining an output from the LLM engine, the output comprising data that corresponds to a semantic analysis of the source data; and presenting a result over the GUI, the result is based on the output, thereby assisting the user with performing the operation.

Yet another exemplary embodiment of the disclosed subject matter is a computerized apparatus having a processor, the processor being adapted to perform the steps of: assisting a user with performing an operation that is based on a semantic analysis of text, the text is presented in a GUI of a page of a third-party application, said assisting comprises: automatically detecting an occurrence of an identification event in the GUI, the identification event indicates that an automation process is associated with the text; automatically determining source data for the automation process from the text; in response to the identification event, presenting an indication of the automation process over the GUI; in response to identifying an interaction of the user with the indication of the automation process, identifying a trigger event, the trigger event invoking an execution of the automation process, wherein the execution of the automation process comprises generating a prompt to a LLM engine, the prompt comprises the source data, wherein the prompt has a predefined structure of a text portion and a variable portion, wherein said generating the prompt comprises replacing the variable portion with the source data; obtaining an output from the LLM engine, the output comprising data that corresponds to a semantic analysis of the source data; and presenting a result over the GUI, the result is based on the output, thereby assisting the user with performing the operation.

Yet another exemplary embodiment of the disclosed subject matter is a computer program product comprising a non-transitory computer readable storage medium retaining program instructions, which program instructions when read by a processor, cause the processor to perform: assisting a user with performing an operation that is based on a semantic analysis of text, the text is presented in a GUI of a page of a third-party application, said assisting comprises: automatically detecting an occurrence of an identification event in the GUI, the identification event indicates that an automation process is associated with the text; automatically determining source data for the automation process from the text; in response to the identification event, presenting an indication of the automation process over the GUI; in response to identifying an interaction of the user with the indication of the automation process, identifying a trigger event, the trigger event invoking an execution of the automation process, wherein the execution of the automation process comprises generating a prompt to a LLM engine, the prompt comprises the source data, wherein the prompt has a predefined structure of a text portion and a variable portion, wherein said generating the prompt comprises replacing the variable portion with the source data; obtaining an output from the LLM engine, the output comprising data that corresponds to a semantic analysis of the source data; and presenting a result over the GUI, the result is based on the output, thereby assisting the user with performing the operation.

Yet another exemplary embodiment of the disclosed subject matter is a system comprising a processor and coupled memory, the processor being adapted to perform: assisting a user with performing an operation that is based on a semantic analysis of text, the text is presented in a GUI of a page of a third-party application, said assisting comprises: automatically detecting an occurrence of an identification event in the GUI, the identification event indicates that an automation process is associated with the text; automatically determining source data for the automation process from the text; in response to the identification event, presenting an indication of the automation process over the GUI; in response to identifying an interaction of the user with the indication of the automation process, identifying a trigger event, the trigger event invoking an execution of the automation process, wherein the execution of the automation process comprises generating a prompt to a LLM engine, the prompt comprises the source data, wherein the prompt has a predefined structure of a text portion and a variable portion, wherein said generating the prompt comprises replacing the variable portion with the source data; obtaining an output from the LLM engine, the output comprising data that corresponds to a semantic analysis of the source data; and presenting a result over the GUI, the result is based on the output, thereby assisting the user with performing the operation.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 3B-3C show exemplary presentations of results, in accordance with some exemplary embodiments of the disclosed subject matter;

DETAILED DESCRIPTION

Figure 1A:
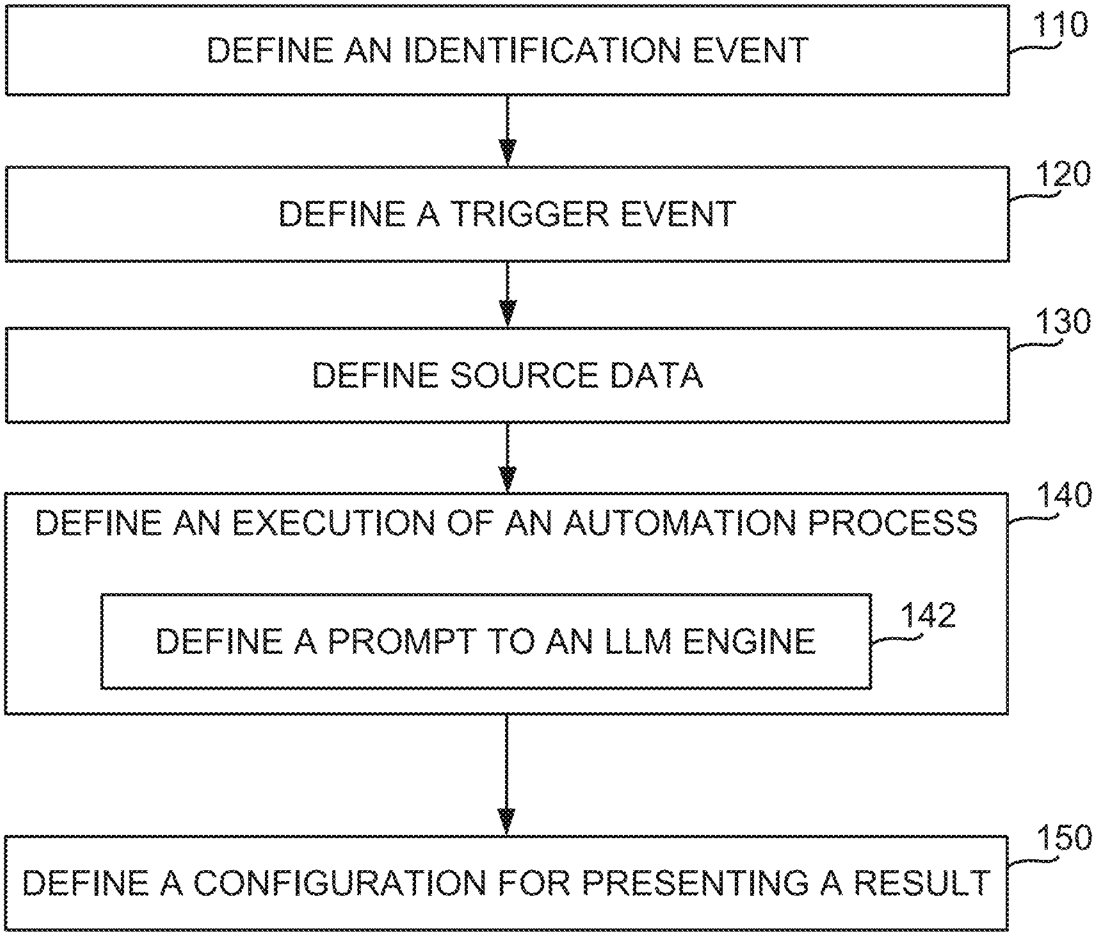
FIGS. 1A-1B show flowchart diagrams of methods, in accordance with some exemplary embodiments of the disclosed subject matter.

One technical problem dealt with by the disclosed subject matter is to aid human users in performing digital tasks. In some exemplary embodiments, digital tasks may comprise actions or activities that users perform using digital devices or platforms. Digital tasks may vary in complexity and purpose, encompassing a broad spectrum of actions conducted in the digital realm. In some cases, performing digital tasks may encompass several operations, such as navigating a website, clicking on links, accessing different pages, using search functionalities, or the like. For example, a digital task may comprise creating digital content such as documents, presentations, images, videos, or the like, editing digital content, filling out text fields, submitting personal information, communicating with other instances or systems, communicating with other users using digital infrastructure, extracting data, executing software applications, a combination thereof, or the like. In some exemplary embodiments, digital tasks may be performed via a digital platform, such as a software application, a desktop application, a web-based application, an operating system, a Software as a Service (SaaS) application, or the like. It may be desired to assist end users with performing digital tasks efficiently, properly, successfully, in a timely manner, or the like.

In some exemplary embodiments, assisting users with digital tasks may be performed using one or more platforms such as a Digital Adoption Platform (DAP). In some exemplary embodiments, a DAP may be designed to help end users navigate and interact with digital assets. In some exemplary embodiments, a DAP may enable to generate an assistance layer that can be executed over a third-party system, and assist users of the third-party system with performing digital tasks. For example, the third-party system may be separate from the DAP, may not collaborate therewith, may not perform Application Programming Interface (API) calls to one another, or the like, and may comprise any software products, applications, or websites.

In some exemplary embodiments, a DAP may be used by administrator (admin) users of an organization as a software platform designed to facilitate and streamline the adoption and usage of digital tools, applications, and software systems within the organization. For example, admin users may define a walkthrough for a third-party application through the DAP, and the walkthrough may be distributed to end users of the third-party application. In some exemplary embodiments, a DAP may enable to perform one or more statistical analyses, identify patterns of end user interactions with a digital asset, or the like. For example, based on statistical analyses of user performance when using a DAP-based walkthrough, admin users may extract insights useful for revising the walkthrough, enhancing portions thereof, or the like.

In some exemplary embodiments, admin users may be enabled to design the assistance layer using DAP building blocks, which may be no-code preconfigured building blocks. In many cases, digital adoption platforms may be no-code platforms, enabling non-programmers to define, using a simple user interface, automations, rules, or the like. For example, via a DAP, an admin may design interactive guidance, interactive walkthroughs, contextual assistance, personalized training, contextual prompts, or the like, to end users, enabling them to navigate and effectively utilize complex software interfaces and functionalities. In some cases, the interactive guidance may be designed to be used by end users such as employees of an organization, customers of the organization, users browsing the web, or any other population segment. As another example, using the DAP, admin users may design the assistance layer to comprise a desired widget (e.g., a walkthrough element), define a behavior associated to the widget, define a sequence of one or more trigger events (with or without branch conditions) configured to invoke the behavior, or the like.

In some exemplary embodiments, the automation processes defined for DAP building blocks may be designed by the admin user to help end-users to complete tasks, learn new features, overcome obstacles, or the like. For example, an admin user may design, via the DAP interface, a validation launcher or tooltip that is configured to, when selected by an end user, validate the value an end-user inputs into a text field, e.g., indicating whether or not the input to the field complies with predefined rules. As another example, a launcher widget (also referred to as "launcher") may be designed by the admin user to trigger predefined content presentations. As another example, an admin user may design, via the DAP, custom tooltips (or "ShoutOuts") that are configured to draw end-user's attention to a featured text or element, in order to assist end users with understanding the element's functionality or significance. As another example, an admin user may design, via the DAP, one or more tooltips configured to appear when an end user hovers their cursor over a specified element such as a button, icon, or link, and to provide supplementary information about the purpose or function of the associated element. In some exemplary embodiments, the assistance layer may be generated using a no-code platform such as a DAP, without requiring the admin user to provide or amend coding.

In some exemplary embodiments, additional aspects of digital adoption platforms are described, inter alia, in U.S. Pat. No. 9,922,008, entitled "Calling-Scripts Based Tutorials", dated Mar. 20, 2018, U.S. Pat. No. 9,934,782, entitled "Automatic Performance Of User Interaction Operations On A Computing Device", dated Apr. 3, 2018, U.S. Pat. No. 10,819,664 "Chat-Based Application Interface For Automation", dated Oct. 27, 2020, U.S. Pat. No. 10,620,975, entitled "GUI Element Acquisition Using A Plurality Of Alternative Representations Of The GUI Element", dated Apr. 14, 2020, and U.S. Pat. No. 10,713,068, entitled "Acquisition Process Of GUI Elements Using User Input", dated Jul. 14, 2020, all of which are hereby incorporated by reference in their entirety for all purposes without giving rise to disavowment.

In some exemplary embodiments, DAPs may have one or more drawbacks. For example, their capability of aiding users with performing digital tasks may be limited. For example, DAPs may lack adequate text analysis capabilities, text generation capabilities, or the like. It may be desired to overcome such drawbacks.

Another technical problem dealt with by the disclosed subject matter is the adaptation of platforms such as DAP platforms to offer a wider range of assistance operations to end users. For example, it may be desired to expand the assistance layer so that it would be able to perform tasks on behalf of users, to analyze and generate text, or the like. For example, instead of classifying whether a user's input to a field is valid or not valid in a binary manner (e.g., using a validation launcher), based on predetermined rules or conditions, it may be desired to provide suggestions of modified content, suggested revisions of the user's input, content-aware feedback on the input, or the like.

Yet another technical problem dealt with by the disclosed subject matter is to assist users with content-related processes of digital tasks. For example, it may be desired to aid users with analyzing submitted data, with generating responses to submitted data, or with similar scenarios.

In some exemplary embodiments, performing digital tasks may encompass a submission of data, text, or the like, such as via digital forms, web-based forms, or the like, into designated third-party systems, websites, applications, or the like. For example, users may be tasked with filling out form fields, according to requirements of the fields or of the form, restrictions of the field, values types and ranges of the fields, or the like. In some exemplary embodiments, designated systems may comprise electronic interfaces designed to collect and organize specific information from end users, such as interactive GUIs presented within software applications or websites, containing designated fields and elements to capture, process, and store user-provided data in a structured manner. In some exemplary embodiments, the interactive GUIs may be designed to enable users to input data, make selections, and perform various actions directly on a screen. In some cases, there may be a significant challenge of assisting end users with providing valuable and proper data when submitting forms. It may be challenging to assess whether the content of the fields is useful, valuable, consistent with other information available, consistent with a policy, or the like. Additionally, it may be challenging to assess manners of revising the fields' content, providing content-based feedback on the fields' content, or the like. It may be desired to overcome these challenges.

One technical solution provided by the disclosed subject matter may be to adapt platforms such as DAPs to provide context-aware DAP building blocks. In some exemplary embodiments, Artificial Intelligence (AI) language models, such as Large Language Models (LLMs), may be combined with DAP building blocks to provide customized assistance to end-users.

In some exemplary embodiments, DAP building blocks may comprise widgets such as launcher widgets, buttons, tooltips, chat windows, balloon layouts, or any other Graphical User Interface (GUI) control, which may be utilized by an administrator user for designing an assistance layer that is configured to assist end users with digital tasks over a software application. For example, widgets may be presented as an overlay over a third-party application. In some exemplary embodiments, DAP building blocks comprise layout adaptations that may be performed within a GUI, e.g., instead or in addition to employing widgets. For example, DAP building blocks may be used to adjust properties of a GUI element in the GUI.

In some exemplary embodiments, using DAP building blocks, an administrator user may generate an assistance layer comprising selected types of building blocks, defined positions for each DAP building block over the pages or layouts of a third-party application, selected automation processes that are linked to each DAP building block, selected trigger events that invoke or activate each automation process, or the like. For example, the administrator user may design and generate the assistance layer over the SALESFORCE® application, or any other application, in order to aid users from his organization with utilized the application efficiently.

In some exemplary embodiments, DAP building blocks may be configured using rules, heuristics, conditions, branches, or the like. For example, a rule may define that upon acquiring a specified element in the GUI, a walk-through step should be presented over the GUI, at a defined position.

In some exemplary embodiments, platforms such as DAPs may be adapted to provide a wider range of building blocks, e.g., to include building blocks that exploit language models such as LLMs. In some exemplary embodiments, instead of configuring a behavior of DAP building blocks only according to heuristics, predetermined rules, or the like, at least some DAP building blocks may be designed to perform an operation in cooperation with an AI language model such as an LLM. For example, LLM infrastructure may be exploited by launcher widgets, tooltip widgets, or any other type of other DAP building blocks, for assisting end users with digital tasks.

In some exemplary embodiments, a language model such as an LLM may comprise a private LLM, a public LLM such as public Generative Pre-trained Transformers (GPTs), a public LLM that is retrained on a private dataset such as an internal knowledge base, an on premise LLM, or the like. In some exemplary embodiments, DAP building blocks may utilize one or more additional technologies, such as Natural Language Processing (NLP) models, different Machine Learning (ML) models, AI models, generative AI models, or the like.

In some exemplary embodiments, combining LLM infrastructure with DAP building blocks may enable the DAP building blocks to provide content-based operations that were previously unfeasible. For example, using LLM infrastructure, a widget may be configured to provide feedback to a user's input, suggest revisions to a user's input, assist users with analyzing text, assist users with generating text, or the like. In some exemplary embodiments, the capabilities of the LLMs may be exploited for performing content-related tasks, semantic analyses, or the like, thereby increasing the capabilities of DAP building blocks, increasing available automation processes provided by a digital adaptation platform, or the like.

One technical problem is ensuring the reliability of outputs generated by LLMs. In some exemplary embodiments, AI language models such as LLMs may not always be reliable, may fabricate data, or the like. In certain exemplary scenarios, LLMs may exhibit inconsistencies, potentially generating fabricated data or similar inaccuracies. For example, this may occur due to biased training data, insufficient training data, lack of sufficient context, or the like.

Another technical problem dealt with by the disclosed subject matter is preserving security and privacy of end-users, when executing LLMs as part of the assistance layer.

One technical solution provided by the disclosed subject matter may be to restrict the services provided by LLMs to defined domains, thereby ensuring reliability. In some exemplary embodiments, instead of exploiting LLM capabilities in an unrestricted manner, LLMs may be utilized under strict and restricted frameworks. For example, LLMs may be provided with predefined prompt structures, predefined text portions, or the like, and may be utilized only for specified operations or tasks, e.g., as specified by an admin user via a DAP platform or other platform.

Another technical solution provided by the disclosed subject matter may be to perform an anonymization of data from the user, before the data is provided to a public LLM. In some exemplary embodiments, in order to preserve the users' privacy, and not provide their Personal Identifiable Information (PII) data to the LLM (e.g., for an LLM that is not on premise), the widget may be configured to filter the source data. For example, the widget may be configured to remove PII data from the source data that is defined for the LLM, replace PII data with non-PII data, alter the PII data to non-PII data, or the like, before providing the source data to the LLM. In some exemplary embodiments, by removing PII data, the privacy of users may be maintained. In some cases, PII data may be identified and replaced using heuristic-based rules, private language models, on premise language models, or the like.

In some exemplary embodiments, DAP building blocks such as widgets may be set, designed, defined, or the like, by an administrator user. In some exemplary embodiments, the widgets may be defined via a DAP platform, via a non-DAP platform, or the like. In some exemplary embodiments, widgets such as launchers and tooltips may comprise interactive GUI elements that may be configured to present data to users, to enables users to activate an automation process, or the like. In some exemplary embodiments, a launcher may comprise an interactive widget that is configured to perform an operation in response to a user interaction, to a defined event, or the like. For example, in response to a user selection of a launcher, an operation may be performed, e.g., executing a walkthrough, presenting a tooltip widget, presenting chat windows, presenting balloon layouts, or the like. In some cases, a tooltip widget may or may not perform an operation irrespective of a user interaction.

In some exemplary embodiments, a widget may be designed to be presented, launched, invoked, or the like, to a user, based on one or more display conditions, identification events, or the like. In some exemplary embodiments, a widget may be defined to be always visible, to be visible on hover, to be visible in response to an identification event, or the like. For example, an identification event may comprise detecting selected text that is selected by the user, detecting user input to a GUI element, detecting that text in the displayed GUI complying with a condition, detecting that a specified element is visible or invisible in the GUI, detecting that a specified Uniform Resource Locator (URL) is loaded, or the like. As another example, an identification event may comprise determining that specified text in the GUI corresponds with one or more conditions, configurations, thresholds, or the like. In some exemplary embodiments, identification events may be configured to be continuously monitored, to be periodically monitored, to be monitored in response to a defined condition, or the like.

In response to an identification event, the widget may be displayed as an indication of the automation process defined thereby. For example, the indication may comprise a textual indication. In some cases, a widget may not indicate an automation process, e.g., in case that an automation process was performed in order to determine that the identification event has occurred. In some exemplary embodiments, a widget may be designed to be presented or displayed in one or more determined positions over the GUI, such as near a specified element. For example, an identification event may comprise detecting user input to a GUI element, and the widget may be presented adjacently to the GUI element. In other cases, the widget may be designed to be presented in any other position, state, or the like, of the third-party application.

In some exemplary embodiments, after a widget is displayed, an automation process associated with the widget may be invoked, executed, or the like, in response to one or more trigger events, automatically, or the like. In some cases, an automation process may be invoked by user actions, automatically, in response to identified trigger events, or the like. For example, an automation process of a widget may be invoked in response to a user selection of the widget, a user interaction with the widget, or the like.

In some exemplary embodiments, widgets may be designed to exploit LLM infrastructure. In some exemplary embodiments, widgets may be set, designed, defined, or the like, to correspond or implement one or more LLM-based automation processes. For example, in response to an identified occurrence of a trigger event, an LLM-based automation process may be performed. For example, a first widget may be set to activate a text summarizing automation process, a second widget may be set to activate a semantic analysis automation process, or the like.

In some exemplary embodiments, widgets may be set, designed, defined, or the like, to utilize one or more prompts to language models such as LLMs, e.g., as part of the automation process. In some exemplary embodiments, the prompts to the LLMs may prompt the LLMs to implement an operation, digital tasks, process, or the like, as part of an automation process associated with a respective widget, a portion of the automation process, or the like. In some exemplary embodiments, an LLM session may be invoked by generating a prompt and communicating the prompt to a locally-deployed LLM, a remote LLM (e.g., on a cloud), or the like.

In some exemplary embodiments, a prompt to an LLM may be defined to encompass source data copied from the GUI of the third-party application, e.g., as presented to an end user via a user device. In some exemplary embodiments, the source data may be defined to comprise a portion of text in the display of the GUI, selected text, text provided to a GUI element by an end user, all text in a rendered page of the third-party application, or the like. For example, an administrator user may define, via a DAP, that a first prompt is configured to incorporate text that is selected by the user, and a second prompt is configured to incorporate text of a defined text field or other text element in the GUI.

In some cases, a prompt to an LLM may define a dataset or content source from which an answer to a question may be retrieved. For example, a prompt stating: "answer question in *input text* based on content sources *1* and *2*" may configure the LLM to answer a question inputted by an end user based on two specified content sources, to which the LLM has access. For example, a content source may comprise a PDF document with company regulations, a website, a repository, a library, or the like.

In some cases, an automation process may comprise a plurality of operations, a subset of which being LLM-based. For example, an automation process may comprise one or more LLM-based operations and one or more non-LLM based operations such as heuristically defined operations, with or without source data. In such cases, operations of an automation process may be defined with respect to identical or different source data. In some cases, an entire automation process may be configured to be implemented by the LLM in response to the prompt, or a component of the automation process may be configured to be implemented by the LLM in response to the prompt.

In some exemplary embodiments, an automation process of a widget may encompass utilizing LLM infrastructure, and presenting an output to a user based thereon. For example, upon a user selection of the widget, an LLM may be called and output a result. In some exemplary embodiments, an output of an automation process may be defined based on one or more LLM sessions, one or more non-LLM operations, or the like. In some cases, the presented output may incorporate a portion of the response from an LLM session, an indication of the response from the LLM, the entire response from the LLM, or the like. For example, a first result may be obtained from an LLM session, and a second result may comprise a statically defined guidance (e.g., guidelines for dealing with frustrated customers).

In some exemplary embodiments, a result or output of an automation process may be configured to be presented according to one or more presentation configurations. In some exemplary embodiments, results may be presented as an overlay over the GUI, such as a popup element, a tooltip, a window, a balloon, a textbox, a chat widget, or the like. In some exemplary embodiments, results may be presented by adjusting the layout of the GUI, e.g., without generating and presenting an overlay on top of the GUI. For example, a result may be presented within an existing text field, may be presented by coloring or highlighting text in the GUI, or the like. In some exemplary embodiments, results may be presented as an overlay that is configured to dynamically match the layout of the underlying GUI, e.g., in color, shape, size, or the like. For example, the presentation of the result may be configured to dynamically adjust its properties. In some exemplary embodiments, results may be presented by appending them to an existing textbox. In some exemplary embodiments, a result may be presented be replacing text in an existing textbox with the result. In some cases, a result may be presented as an image or element, such as a green marking for proper input and a red marking (e.g., alone or in addition to a text element with suggestions) for improper input.

In some exemplary embodiments, the presentation configurations may configure a target location for presenting the result. For example, the target location may or may not correspond to the location of the widget. In some exemplary embodiments, the target location may be defined with respect to one or more GUI element, with respect to a percentage of a page, with respect to a specific state of an application, or the like. For example, in case the presentation configurations define that the result is to be presented by highlighting an existing text snippet in the GUI (e.g., a most important area of a support ticket), the result may be presented by performing an automatic scroll until reaching the text snippet, and then highlighting the text snippet.

In some exemplary embodiments, the combination of widgets and LLM infrastructure may be configured to assist end users with performing a plurality of content-related digital tasks, text-based digital tasks, or the like, e.g., as part of the assistance layer. In some exemplary embodiments, text-based digital tasks may comprise any task or operation that involves or is based on text provided by an end user or reviewed by an end user. In some exemplary embodiments, text-based digital tasks may comprise filling out forms, submitting forms, reviewing form submissions, responding to form submissions, or the like.

For example, LLM technology may be utilized to revise the user's inputted text, refine text written by the end user, provide suggestions for text revisions, or the like. As another example, LLM technology may be utilized to enhance a process of reviewing form submissions, such as by providing summaries of the submitted text, insights regarding the semantic properties of the submitted text, insights from text that is to be reviewed by the end user, or the like. For example, the widget can obtain text representing a badly written email, and return a revised version of the email.

In some exemplary embodiments, a text analysis task may refer to any task that is designed to assist end users with analyzing, reviewing and/or understanding text. For example, a text analysis task may comprise a reading comprehension task intended to assist end users with understanding the meaning of passages, articles, or documents and answering questions based on the content. As another example, a text analysis task may comprise an information extraction task intended to assist end users with identifying specific pieces of information, such as names, dates, locations, or events, from source data. As another example, a text analysis task may comprise a summarization task intended to assist end users by providing them with summaries of longer texts that retain the key information and main ideas. As another example, a text analysis task may comprise a question answering task intended to assist end users with providing accurate responses to questions posed based on the information presented in a given source data. As another example, a text analysis task may comprise a sentiment analysis task intended to assist end users with analyzing the tone, emotion, or attitude conveyed in text passages, such as determining whether a review is positive, negative, or neutral.

In some exemplary embodiments, a plurality of automation processes for widgets may be configured to assist users with text analysis tasks, implement text analysis tasks on behalf of a user, or the like. For example, a user case in which text analysis tasks are desired, may include a form submission reading use case, in which end users such as support agents may require assistance with reading and understanding form submissions that are submitted by one or more different entities, e.g., clients. In other cases, text analysis tasks may be desired and utilized in any other user case, scenario, or the like.

In some exemplary embodiments, reviewing and reading form submissions may be a tedious and time-consuming task. In some exemplary embodiments, a user (e.g., a support agent) may typically be required to review and analyze dozens of tickets a day. For example, desk agents may be required to review and analyze support tickets, managers may be required to review and analyze employees' quarterly review goals, sales managers may be required to review and analyze deal statuses, managers may be required to review and analyze expense reports, or the like. In some cases, support agents may encounter difficulties in performing their tasks optimally due to various factors such as the high volume of forms they are required to handle and limited time availability. For example, when faced with numerous form submissions, agents may be overwhelmed, increasing the likelihood of errors or oversights when attempting to enforce an organization's policy. In some cases, tight deadlines may exert pressure on agents to complete reviews hastily, which may compromise the accuracy and thoroughness of the review process, and reduce the quality of service provided to customers.

In some exemplary embodiments, in order to assist support agents with text analysis task such as reviewing and analyzing form submissions, widgets may be designed and generated to utilize LLM technology to enhance a process of reviewing form submissions, according to various use cases. For example, widgets may enhance the process of reviewing form submissions by providing summaries of the submitted text, providing insights regarding the semantic properties of the submitted text, extracting action items from text, providing text explanations, finding automatic answers for questions posed by the text, analyzing the sentiment of the text, classifying free text of a form into predefined buckets, translating text into another language, allowing the end user to enter a question about the text, or the like.

In some exemplary embodiments, an automation process of a widget may comprise one or more sub-processes. In some exemplary embodiments, the admin user may define, for a sub-process (e.g., LLM session) of an automation process that is configured to process text, source data. In some exemplary embodiments, the source data may define which text from the GUI should be processed by the sub-process. For example, a sub-process may be configured to process selected text marked by the user, text provided to a specified element, all text in the GUI, all text in a rendered page, or the like.

In some exemplary embodiments, defining an automation process of a widget may comprise selecting the automation process from a set of pre-set automatic processes, defining all properties of the automation process manually via the DAP, or the like. In some cases, selecting a pre-set automatic process such as a text summarizing automation process from a set of pre-set automatic processes, may cause other settings of the widget to be set automatically, such as by automatically setting the source data to include selected text that is selected by the user (e.g., unless the admin user explicitly changes the source data configuration), automatically setting a result presentation configuration, automatically setting the prompt to include: "please summarize in 2-3 sentences the text provided in *input-text*", where *input-text* denotes the source data, or the like.

In some exemplary embodiments, the prompt may be defined to have a predefined structure, e.g., a structure comprising a static portion that is specific to the task intended to be performed by the LLM, a dynamic context portion that comprises text extracted from the user's GUI, user constraints which may be added on a user-level, an organization level, or the like. In some cases, a prompt may be configured to instruct the LLM to provide, in addition to a desired digital task, a manner of presenting a result, a position for presenting the result, or the like.

In some exemplary embodiments, the DAP may allow the admin user, e.g., a builder, to define the prompt to the LLM, to define one or more text elements or portions that should be embedded in one or more areas of the prompt, to define data to be provided to the LLM, to adjust a suggested prompt for a pre-set automatic process, or the like. In some exemplary embodiments, the widgets may be designed to present an output from the LLM, an indication thereof, a processed version thereof, or the like, according to a defined configuration, in a defined element, or the like.

In one scenario, a summarizing widget may be configured to summarize a long thread of support tickets, quarterly review goals, deal statuses, expense reports, sales processes, or the like. According to this example, the widget may be configured to present an indication of the summarizing functionality over a GUI, and, upon being selected or clicked by a user (e.g., the trigger event), to summarize text from a defined data source. For example, the defined source may comprise selected text, visible text in the GUI, all text in a rendered page, or the like. According to this example, in order to summarize the text, the widget may be defined to automatically call an LLM with copied text that is extracted from the defined source. In some cases, the prompt for the LLM may have a predefined structure with a static portion and a dynamic portion. For example, the static portion may state: "Please summarize the following text into up to five bullet points", or any similar prompt having similar semantic meaning, and the dynamic portion may incorporate the text from the defined source. In some exemplary embodiments, the output from the LLM may be presented in one or more defined elements, configurations, positions, or the like, such as in a tooltip.

As another example, a widget may be configured to extract action items from a communication with a customer, from support tickets, from quarterly review goals, or from any other thread or text item. According to this example, upon being selected or clicked by a user (e.g., the trigger event), the widget may be defined to automatically call an LLM with text from a defined source. For example, the prompt to the LLM may comprise a static portion stating: "Please extract action items from the following text", or any similar prompt having similar semantic meaning, and the dynamic portion of the prompt may incorporate the text from the defined source. As another example, the static portion of the prompt may state: "For the following employee quarterly review please return true if the employee wishes to be promoted. Return false otherwise", and the dynamic portion may incorporate the text from the defined source, thereby enabling to add to the employee quarterly review a tooltip describing whether the employee wants a promotion, and potentially providing associated guidance. In some exemplary embodiments, the output from the LLM may be presented in one or more defined elements, configurations, positions, or the like, such as in a tooltip, copied to a clipboard, or the like.

As another example, a widget may be configured to assist users, such as Information Technology (IT) helpdesk users, to find quick solutions to customers' problems. According to this example, upon being selected or clicked by a user (e.g., the trigger event), the widget may be defined to automatically call an LLM with text from a defined source. For example, the prompt to the LLM may comprise a static portion stating: "Explain this to me", or any similar prompt having similar semantic meaning, and the dynamic portion of the prompt may incorporate the text from the defined source. For example, the defined source may comprise the end user's query. In some exemplary embodiments, the output from the LLM may be presented to the IT helpdesk users in one or more defined elements, configurations, positions, or the like, such as in a tooltip.

As another example, a widget may be configured to assist users, such as support agents, to find an answer in an internal Knowledge Base (KB) to a question posed by a different user (e.g., a customer). According to this example, upon being selected or clicked by a user (e.g., the trigger event), and in case that a search is available on the internal KB, the widget may be defined to automatically call an LLM with text from a defined source. For example, the defined source may comprise the question, the internal KB, or the like. In some exemplary embodiments, the output from the LLM may be presented to the user in one or more defined elements, configurations, positions, or the like, such as in a tooltip.

As another example, a widget may be configured to assist users, such as support agents, to detect a sentiment of text in a support ticket. For example, the widget may assist users with detecting customer bad sentiment, employee bad sentiment, or the like, and alert the support agent in such cases. According to this example, the widget may not be presented at first, and may be configured to automatically call an LLM with text from a defined source, e.g., text of the support ticket, such as upon identifying a support ticket. For example, the prompt to the LLM may comprise a static portion stating: "Provide me the sentiment of the following text. The result should be a number from 1 to 10 where 1 is a very bad sentiment and 10 is a very good sentiment", or any similar prompt having similar semantic meaning, and the dynamic portion of the prompt may comprise the text from the support ticket. According to this example, in case the result from the LLM indicates a negative sentiment (e.g., an identification event), such as when the score being less than a threshold defined by the builder or any other threshold, the widget may be configured to be presented to the user. For example, widget may comprise a text string alerting the user of the negative sentiment, thereby enabling to raise the attention of the support agent to the bad sentiment. The widget may be positioned adjacent to the support ticket, or in any other defined location. In some cases, the widget may be configured to, upon the widget being selected or clicked by the user (e.g., the trigger event), provide guidance to the user on handling the situation. For example, widget may invoke a second LLM session for fetching the guidance, invoke a second LLM session for providing a suggested response to the negative support ticket, present a static guidance written by the admin, or the like.

As another example, a widget may be configured to assist users, such as managers, to classify free text reports, e.g., expense reports, into defined buckets or bins. According to this example, the widget may not be presented at first, and may be configured to automatically call an LLM with text from a defined source, e.g., text from the expense reports. For example, the prompt to the LLM may comprise a static portion stating: "Please classify the following text into one of the following buckets. If it does not match any, write that it does not match any bucket. Buckets include: IT Expense, Personal Expense, and Business Expense", or any similar prompt having similar semantic meaning, different buckets, or the like, and the dynamic portion of the prompt may comprise the text from the defined source. In some cases, buckets may be classified by the builder (e.g., the admin user) to buckets that invoke an alert and buckets that should not invoke an alert. According to this example, in case the result from the LLM indicates that the text was classified by the LLM into a predefined bucket that should invoke an alert (the identification event), e.g., an IT expense, a business lost reason, or the like, the widget may be presented to the user. For example, the widget may depict a text string intended to raise awareness to the classification of the text into an alert-invoking bucket. In some cases, the widget may be configured to, upon the alert icon being selected or clicked by the user (e.g., a trigger event), provide guidance to the user on handling the situation. For example, widget may invoke a second LLM session for fetching the guidance, invoke a second LLM session for providing a suggested response to the bucket, present a static guidance written by the admin, or the like.

As another example, a widget may be configured to assist users to translate text into another language, such as when obtaining any type of submitted form in a language unknown to the user, in a language different than a default language, or the like. According to this example, the widget may be presented (e.g., when identifying the form), and upon being selected or clicked by a user (e.g., the trigger event), the widget may be defined to automatically call an LLM with text from a defined source, e.g., the form. For example, the prompt to the LLM may comprise a static portion stating: "Translate the following text into English", or any similar prompt having similar semantic meaning, and the dynamic portion of the prompt may comprise the text from the defined source. In some exemplary embodiments, the output from the LLM may be presented to the user in one or more defined elements, configurations, positions, or the like, such as in a tooltip.

As another example, a widget may be configured to assist users, such as support agents, with asking a question about a long support thread. According to this example, the widget may be presented (e.g., in response to identifying the thread) and, upon being selected or clicked by a user (e.g., the trigger event), the widget may be defined to automatically call an LLM with text from the thread. For example, the prompt to the LLM may comprise a static portion stating: "Answer the following question on the provided text: Question: *end user question *. Text: *text*", or any similar prompt having similar semantic meaning, and the dynamic portion of the prompt may replace the placeholder: *end user question* with the question, and replace *text* with text from the thread. For example, the question may comprise: "Is the problem reproducible?", and may be provided by the user via a text input field of the widget, of an associated element, or the like. In some exemplary embodiments, the output from the LLM may be presented to the user in one or more defined elements, configurations, positions, or the like, such as in a tooltip.

In some exemplary embodiments, in addition to assisting users with text analysis tasks, end users may be assisted with text generation tasks. In some exemplary embodiments, a text generation task may refer to any task that is designed to assist end users with generating or writing text.

For example, a text generation task may comprise converting bullet points into continuous text. As another example, a text generation task may comprise refining text to be more professional, to comply with language policies or guidelines set forth by the organization, or the like. As another example, a text generation task may comprise changing a tone of text (e.g., to be apologetic). As another example, a text generation task may comprise a responding task intended to assist end users with generating responses to a defined content or text such as support tickets. As another example, a text generation task may comprise a dialogue task intended to assist end users with communications in dialogues such as chatbots, sales communication with a customer, or the like. As another example, a text generation task may comprise assisting end users with writing reports or reviews such as an employee performance review. As another example, a text generation task may comprise a summary task intended to assist end users with generating summaries of longer texts while retaining the key information and main ideas. As another example, a text generation task may comprise an answer searching task intended to assist end users with generating responses to questions posed based on information presented in a given source data, database, content repository, or the like.

In some exemplary embodiments, a plurality of automation processes for widgets may be defined for a plurality of text generation tasks. In some exemplary embodiments, end users may be assisted with filling out forms, filling out support tickets, filling out quarterly review goals, filling out expense reports, or the like. In some exemplary embodiments, instead of merely providing static instructions for filling out a text field, validating the user's input to the text field using a binary classification, or the like, the widget may be configured to actively contribute to the textual generation. For example, the widget may be configured to actively rewrite the user's input in an enhanced manner, by exploiting LLM infrastructure. According to this example, the widget may, upon being selected or clicked by the end user, copy text that was inputted by the user to the field, send the text to the LLM using a defined prompt template, and present the outcome in the text field or as an overlay near the text field (e.g., in a tooltip). For example, the outcome from the LLM may be concatenated to the original input of the user within the text field (e.g., to prevent losing original text), may replace the original input within the text field, may be presented in a different widget such as a tooltip, or the like.

As an example, a widget may be configured to assist users with converting bullet points (provided by a user) into continuous text. According to this example, the widget may be presented and, upon being selected or clicked by a user (e.g., the trigger event), the widget may be defined to automatically call an LLM with the bullet points. For example, the prompt to the LLM may comprise a static portion stating: "Take the following text and transform it into a continuous text that can be sent to the recipient. The produced text should not be more than 100 words", or any similar prompt having similar semantic meaning, and the dynamic portion of the prompt may comprise text from a defined source, e.g., the bullet points. In some exemplary embodiments, the output from the LLM may be presented to the user in one or more defined elements, configurations, positions, or the like, such as in a tooltip.

As another example, a widget may be configured to assist users with refining or revising text, such that the text will sound more professional, formal, or the like. According to this example, upon being selected or clicked by a user (e.g., the trigger event), the widget may be defined to automatically call an LLM with the source data. For example, the prompt to the LLM may comprise a static portion stating: "Convert following text to be more professional written", or any similar prompt having similar semantic meaning, and the dynamic portion of the prompt may comprise text from a defined source, e.g., the original user input. In some exemplary embodiments, the output from the LLM may be presented to the user in one or more defined elements, configurations, positions, or the like, such as in a tooltip.

As another example, a widget may be configured to assist users with changing a tone of original text provided by the user, e.g., to sound funny, serious, apologetic, defiant, formal, informal, professional, casual, friendly, authoritative, or the like. According to this example, upon being selected or clicked by a user (e.g., the trigger event), the widget may be defined to automatically call an LLM with the original text. For example, the prompt to the LLM may comprise a static portion stating: "Convert the following text to sound more professional", or any similar prompt having similar semantic meaning, and the dynamic portion of the prompt may comprise text from a defined source, e.g., the original user input. In some exemplary embodiments, the output from the LLM may be presented to the user in one or more defined elements, configurations, positions, or the like, such as in a tooltip.

As another example, a widget may be configured to assist users with filling out a text field (e.g., of a form). According to this example, upon being selected or clicked by a user (e.g., the trigger event), the widget may be defined to automatically call an LLM with the inputted text. For example, the prompt to the LLM may instruct the LLM to validate the input against definitions of a proper input, against a document defining a policy for filling out the form, against fill requirements of the target form, or the like. As another example, the prompt to the LLM may instruct the LLM to provide revision and suggestions to the input. The dynamic portion of the prompt may comprise the user input to the field, e.g., the source data. For example, a form may comprise a field with the following instruction or validation logic: "please provide churn reason". According to this example, the prompt to the LLM may state: "a person was requested to fill a field in a form for which the requirement was: *validation logic*. The person filled in the following text: *input text*. Please specify if this text is valid given the requirement and provide a suggestion to improve it in JSON format {is_valid: boolean, improvement_suggestion: string}", where *validation logic* is replaced with the validation logic and *input text* is replaced with the input to the field. In some exemplary embodiments, the output from the LLM may be presented to the user in one or more defined elements, configurations, positions, or the like, such as in a tooltip, adjusting the GUI to mark the text as improper, concatenating suggestions into respective fields, or the like.

In some exemplary embodiments, after widgets are defined by an admin user, the defined widgets may be deployed and executed by a plurality of user devices. In some exemplary embodiments, statistics regarding the performance of the widgets may be gathered, accumulated, measured, analyzed, or the like, such as by the DAP, by a server that distributed the defined widgets, or the like. In some exemplary embodiments, the performance of the widgets may be measured by determining their effect on end user's success in digital tasks, before and after deployed the widgets, before and after adjusting configurations of widgets, or the like.

It is noted that although the disclosed subject matter is exemplified with a widget, the disclosed subject matter may be utilized for any other DAP building block.

One technical effect of utilizing the disclosed subject matter is aiding human users in completing digital tasks. For example, using the disclosed subject matter, end users may be assisted with executing digital tasks efficiently, properly, successfully, in a timely manner, or the like, which may enhance the productivity and engagement of end users.

Another technical effect of utilizing the disclosed subject matter is assisting users with performing content-related digital tasks. For example, the disclosed subject matter enables widgets to automatically generate suggested responses, reviews, or the like, based on the identified text in form submissions. As another example, the disclosed subject matter enables widgets to automatically present results of text analysis, such as a summarization of a long thread of support tickets.

Yet another technical effect of utilizing the disclosed subject matter is paving the way to responsible AI that can be suitable for each enterprise. The disclosed subject matter provides an LLM experience that is predictable, explainable and safe, unlike other forms of generative AI that may not necessarily be responsible. The predictability may be achieved by configuring the functionality of the widgets on restricted source data defined by the builder, and using a specific prompt defined by the builder, thereby restricting the LLM and preventing unrestricted operations thereof. In some cases, a same framework or configuration may be used for widgets in a plurality of scenarios or use cases, for different automation processes, e.g., by sending different prompts to the LLM, thereby enabling a wide range of functionalities within a same restricted framework.

Yet another technical effect of utilizing the disclosed subject matter is providing privacy preserving widgets, which may assist end users with digital tasks without providing their PII data to the LLM.

Yet another technical effect of utilizing the disclosed subject matter is providing an improvement in DAP platforms, by increasing the capabilities of DAP platforms to offer LLM-based automation processes that can be implemented for DAP building blocks such as launcher widgets, tooltip widgets, or the like. The disclosed subject matter further enables builders to create widgets with customized functionalities that match the enterprise's policy and way of working, thus providing customer-specific functionalities using a no-code platform such as a DAP, without requiring the admin user to provide or amend code directly. It is noted that the disclosed subject matter is not limited to a specific digital adoption platform, and can be implemented for non-DAP platforms as well.

Yet another technical effect of utilizing the disclosed subject matter is providing a user-friendly solution that may increase a user engagement. In some cases, a human to machine interaction may be enhanced by presenting widgets of automation processes only in locations defined by the builder as being useful and relevant to the automation processes, and by enabling users to obtain a result of a content-based automation process by a mere selection of a widget, without requiring additional user input. In some exemplary embodiments, the disclosed subject matter enables user devices to deploy defined widgets in a swift and easy manner, reducing customers' end users' efforts.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing a flowchart diagram of a method, in accordance with some exemplary embodiments of the disclosed subject matter.

On Step 110, an identification event may be defined in a digital adoption platform that is agnostic to third-party applications. In some exemplary embodiments, using the digital adoption platform, an assistance layer may be defined and generated, and used to assist end users with performing one or more functionalities in one or more third-party applications. In some exemplary embodiments, the third-party application over which the assistance layer may be configured to be executed, may be independent from the digital adoption platform, may not have Application Programming Interface (API) communications therewith, may not have backend communications therewith, or the like. In some exemplary embodiments, the assistance layer may comprise one or more DAP building blocks, widgets, or the like, such as launchers, tooltips, GUI controls, or the like. In other cases, the identification event may be defined in any other manner, platform, or the like.

In some exemplary embodiments, an admin user associated with the third-party application may set one or more conditions that define the identification event. For example, the identification event may be defined to occur when text is selected by the user, when user input is provided to a GUI element, when text in a displayed GUI complying with a condition, when a specified element is visible or invisible in the GUI, when that a specified Uniform Resource Locator (URL) is loaded in the GUI, when a user hovers over a defined element, a combination thereof, or the like. In other cases, the widget may be defined to be always visible, regardless of the identification event.

In some exemplary embodiments, the identification event may be configured to, when detected, cause an indication of an automation process to be presented over a GUI of a third-party application. In some exemplary embodiments, the indication of the automation process may comprise a widget such as a launcher, a tooltip, or the like. In some exemplary embodiments, the widget that is configured to be presented in response to the identification event, may indicate an automation process that can be performed, an automation process that was performed, or the like. For example, the widget may comprise a text string describing the automation process, a linked text string, a GUI control, a drawing, or any other visual element, audio indication, or the like, indicating the respective automation process. For example, the text string may describe the automation process, a name of the automation process, a goal of the process, any other property associated with the automation process, or the like. In some exemplary embodiments, the widget may indicate the automation process in any other way.

In some exemplary embodiments, a target location may be configured for presenting the indication of the automation process, e.g., the widget. In some exemplary embodiments, in case the widget is defined in association to an element that is displayed in the GUI, the target location may be adjacent to the element. In other cases, the target location for presenting the indication of the automation process may comprise any other location in the GUI. For example, the widget may be presented as an overlay over the third-party application. In some exemplary embodiments, the widget may not be defined by the third-party application. For example, the widget may be defined by the DAP, to be applied over the third-party application.

In some cases, the identification event may comprise automatically identifying that one or more conditions are complied with (e.g., an element is visible), automatically performing an automation process based thereon, automatically determining whether an output of the automation process complies with one or more conditions, and in response to compliance with the conditions, presenting the widget. For example, the widget may indicate the output from the automation process, a second automation process that can be performed, or the like. In some cases, the identification event may be defined using one or more acquisition techniques, such as those disclosed in U.S. Pat. No. 10,620,975, entitled "GUI Element Acquisition Using A Plurality Of Alternative Representations Of The GUI Element", dated Apr. 14, 2020, which is incorporated by reference in its entirety for all purposes without giving rise to disavowment. For example, such acquisition techniques may enable to identify GUI elements in the GUI, as rules that may invoke the identification event.

On Step 120, a trigger event may be defined for the automation process of a widget. In some exemplary embodiments, the trigger event may be detectable after the widget is presented, e.g., after the identification event is identified.

In some exemplary embodiments, the admin user may set or configure each widget to invoke one or more respective automation processes. In some exemplary embodiments, each automation process may comprise one or more rules, conditions, or the like, which may be configured to process source data. In some exemplary embodiments, a plurality of automation processes may be defined for respective widgets. In some exemplary embodiments, an automation process may be defined for each widget, and may or may not incorporate an LLM engine. In some exemplary embodiments, an automation process may encompass one or more LLM operations, in which an LLM is utilized with a defined prompt.

In some exemplary embodiments, an automation process may be configured to be invoked by one or more trigger events, conditions, or the like, such as a user selecting the presented widget. In some exemplary embodiments, the trigger event may be defined to trigger, cause or invoke an activation of an automation process of the widget. For example, the trigger event may comprise a user interaction of an end user, such as a selection of the widget. As another example, the trigger event may comprise determining that a condition associated with text presented in a GUI is complied with. In other cases, the trigger event may comprise any other event, condition, branch of conditions, or the like.

On Step 130, source data associated to the automation process may be defined. In some exemplary embodiments, the widget may be defined in association with source data that is to be processed by the automation process of the widget. In some exemplary embodiments, the source data may comprise at least a portion of the text presented in the GUI. For example, the source data may comprise text associated to an element that is displayed in the GUI. According to this example, the automation process may correspond to the element, be defined based on the element, or the like. As another example, the source data may comprise selected text that is displayed in the GUI, e.g., selected by an end user. According to this example, the automation process may correspond to the selected text. As another example, the source data may comprise all text that is displayed in the GUI, all text that is rendered in the page, or the like. According to this example, the automation process may correspond to the text. In one scenario, the source data may include text from one or more fields reflecting a submission of another user, text from one or more fields reflecting a drafting of a submission by the user, or the like.

In some exemplary embodiments, the source data may comprise text presented in a GUI of a page of a third-party application, a third-party mobile application, a third-party desktop application, or the like. In some exemplary embodiments, the third-party application presenting the source data may be independent from the digital adoption platform, may not have Application Programming Interface (API) communications therewith, may not have backend communications therewith, or the like.

In some exemplary embodiments, a plurality of automation processes may be defined for the same source data. For example, first and second automation processes may be defined for a same source data, resulting with first and second widget being presented over the GUI, e.g., in different target locations. In other cases, a single automation process may be defined for the source data.

On Step 140, in response to the trigger event, the automation process of the widget may be executed. For example, the automation process may be executed in response to a user selection of the widget, a user hovering over the widget, a vocal command associated with the widget, or the like. In some exemplary embodiments, executing the automation process may or may not encompass exploitation of LLM technology, e.g., according to Sub-Step 142.

On Sub-Step 142, as part of executing the automation process, a prompt to an LLM engine may be defined, generated, or the like, e.g., in response to identifying a user interaction with the indication of the automation process. In some exemplary embodiments, the prompt may be configured to utilize LLM technology for performing one or more text analysis tasks, text generation tasks, or the like.

In some exemplary embodiments, the prompt may be configured to comprise a predefined structure of a text portion and a variable portion. In some exemplary embodiments, at least a portion of the variable portion may be configured to be replaced with the source data every invocation of the trigger event. For example, the variable portion may be replaced with first source data after a first trigger event, and with second source data after a second trigger event. As another example, a first variable portion of a prompt may be replaced with a user input, and a second variable portion of the prompt may be replaced with the source data. In some exemplary embodiments, the text portion of the prompt may be set to comprise a background section describing a background of the automation process, a command section comprising a request for processing the variable portion according to the automation process, a user section for incorporating user-specific instructions (e.g., according to a policy of a customer), or any other instruction related to the automation process. In some exemplary embodiments, generating the prompt and presenting an output therefrom may constitute, together or separately, at least a portion of the automation process.

For example, in case the page includes one or more fields reflecting a submission of another user, the prompt may be generated to instruct the LLM engine to perform a text generation task configured to assist an end user with responding to the submission. As another example, in case the page includes one or more fields reflecting a submission of another user, the prompt may be generated to instruct the LLM engine to perform a text analysis task analyzing text of the submission, in order to provide an end user with insights useful to handle the submission.

In some exemplary embodiments, generating the prompt may or may not include removing PII data from the source data in the prompt, replacing PII data in the source data of the prompt with non-PII data, or the like. For example, this may be performed using a predictor trained to identify PII data, using generated rules for identifying and replacing PII data, or the like.

In some cases, the automation process may be configured to be performed with respect to a knowledge base, a data repository, a content source, or the like (referred to as the "content source"). For example, the content source may comprise a database, and the prompt to the LLM may be determined based on at least a portion of retrieved data that is retrieved from the content source, e.g., using a query. For example, the prompt may execute a search engine that has access to the content source, the prompt may enable the LLM to search the content source directly, or the like. As another example, the content source may be searched by the widget using non-LLM rules. In some exemplary embodiments, retrieved data from the content source may be selected to be retrieved in case it conforms to one or more conditions, rules, or the like. For example, in case the data conforms with a similarity metric with respect to the source data, with respect to portion of the predefined structure of the text portion, or the like, the data may be extracted as an answer.

On Step 150, a configuration for presenting a result in the GUI may be defined. In some exemplary embodiments, the result may be determined based on an output from the LLM engine. For example, a result of an automation may be determined based on one or more LLM sessions, one or more rules, a combination thereof, or the like.

In some exemplary embodiments, the admin user may set or configure a manner of presenting a result of an automation process. For example, a result presentation configuration may define where the result should be presented, a composition of the result (e.g., static text combined with an LLM output), an element in which the result should be presented (if any), or the like.

In some exemplary embodiments, the configuration of presenting the output may comprise updating one or more properties of the GUI based on the result from the LLM engine. For example, one or more properties of the GUI such as a color of a text element, a highlighting of a text element, a color of a non-text element, or the like, may be updated. As another example, the result may be inserted in a textbox in the GUI and displayed thereby. As another example, the result may be presented in a textbox by updating a visual characteristic of at least a portion of the textbox. As another example, the result may be presented in a text input field, e.g., by appending the result to pre-existing text in the text input field. As another example, the result may be presented in a text input field by updating the text input field to present the result. As another example, the result may be presented in a popup element that is configured to be displayed over the GUI, the popup element not being part of the underlying third-party application. As another example, the result may be presented in a chat widget that is not part of the third-party application.

In some exemplary embodiments, the configuration of presenting the result may comprise configuring a target location for presenting the output. For example, the target location may comprise a location adjacent to an element in the GUI, a location not adjacent to any element, a specific position in a rendered page of the third-party application, or the like. For example, in response to identifying the user interaction, an automatic scroll of the page may be performed until reaching a displayed portion of the page that depicts the specified position of the target location.

In some exemplary embodiments, Steps 110-150 may be performed via the digital adoption platform, or via any other platform.

In some exemplary embodiments, after defining the full capabilities and properties of the widget, such as according to Steps 110-150, the widget may be activated accordingly, deployed over the third-party application, or the like, e.g., when the third-party application is rendered over a plurality of user devices. For example, the widget may be executed over an end user of an end device according to the steps of FIG. 1B.

Figure 1B:
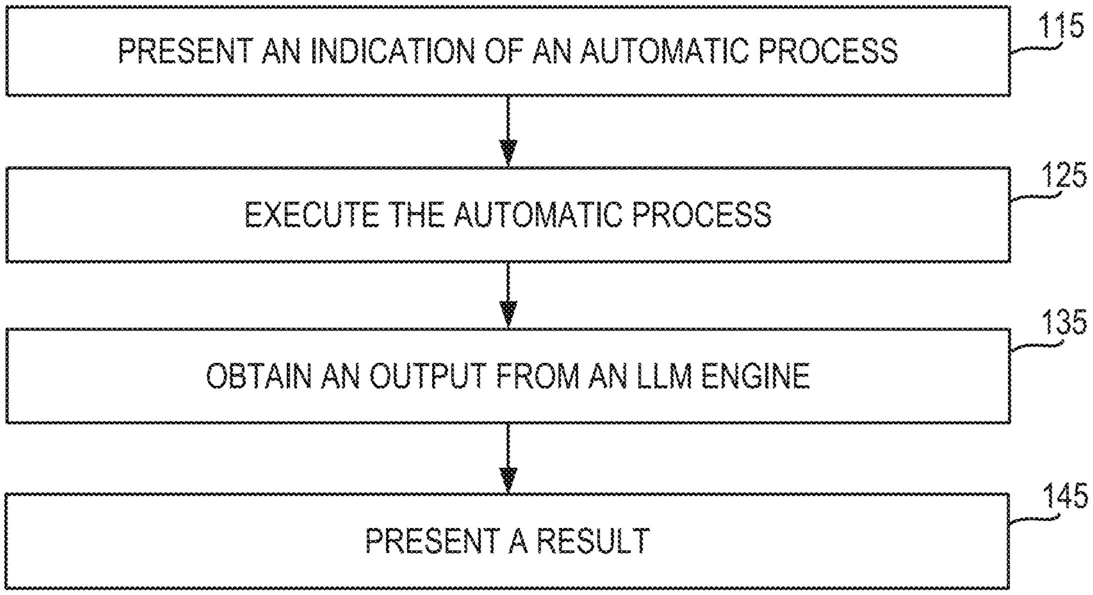

Referring now to FIG. 1B showing a flowchart diagram of a method, in accordance with some exemplary embodiments of the disclosed subject matter.

In some exemplary embodiments, a third-party application may be used by an end user. For example, the third-party application may be launched over a user device, enabling the rendering one or more pages that the end user can engage with interactively.

On Step 115, an indication of an automation process may be presented over the GUI of the third-party application, e.g., in a widget. For example, the indication may comprise a widget such as a launcher presenting a text string, a visual indication, or any other indication of the automation process. In some exemplary embodiments, the indication may not be defined or programmed by the third-party application, which may be executed on an end device of a user. For example, users of the third-party application may comprise members of a certain organization, support agents, general users, or the like. In some exemplary embodiments, the end device of the user may execute a local software agent, which may be configured to provide an assistance layer over the third-party application. For example, the agent may execute a SaaS application, a desktop application, an extension to a browser, a Software Development Kit (SDK), a shared library, a Dynamic Link Library (DLL), or the like. In some cases, the assistance layer may comprise one or more defined widgets, such as widgets defined according to the steps of FIG. 1A.

In some exemplary embodiments, the indication of an automation process may be presented in response to an identification event, e.g., the identification event defined in Step 110. For example, the indication may be presented in response to identifying that a GUI element is visible in the GUI, that a specified URL is rendered, or the like. As another example, an event may be identified (e.g., indicating that a GUI element is visible in the GUI), a respective automation process may be executed automatically (e.g., determining a sentiment of text in the GUI), and, in case the result from the automation process complies with a condition (e.g., determining whether the sentiment of text in the GUI is worse than a threshold), an indication of a second automation process may be presented (e.g., indicating the bad sentiment).

On Step 125, the automation process that is indicated by the widget, may be executed, activated, invoked, or the like. In some exemplary embodiments, the automation process may be executed in response to a trigger event, e.g., an interaction of the end user with the indication of the automation process, such as by selecting the widget, hovering over the widget, or invoking the widget in any other way. In some exemplary embodiments, the trigger event may be defined for the third-party application according to Step 120, e.g., by an admin user.

In some exemplary embodiments, executing the automation process may comprise performing one or more predefined operations. In some cases, at least some of the operations may be defined on source data from the GUI. In some cases, at least some of the operations may comprise generating a prompt to a LLM engine, e.g., on the source data. In some exemplary embodiments, the prompt may comprise at least a portion of the source data, one or more static portions, one or more user inputs, or the like. In some exemplary embodiments, the prompt may have a predefined structure of a static portion and a variable portion. In some exemplary embodiments, generating the prompt may comprise replacing the variable portion with the source data, with one or more user inputs, or the like, while retaining the static portion.

In some exemplary embodiments, source data for the automation process may be automatically determined, selected, or the like, from text in the GUI, e.g., according to source data defined on Step 130. In some exemplary embodiments, the source data may be identified in response to the user interaction, before the user interaction, or the like.

On Step 135, an output may be obtained from the LLM engine, e.g., in case the automation process defined an LLM-based operation, session, or the like. In some exemplary embodiments, the output may be obtained from the LLM engine in response to the prompt. In some exemplary embodiments, the output may comprise data that corresponds to a semantic analysis of the source data, data that corresponds to a summarization of text, or the like. In some exemplary embodiments, the output may comprise data that corresponds to a text analysis task of the source data, a text generation task of the source data, or the like. In some exemplary embodiments, the output may be configured to assist end users with performing digital tasks.

On Step 145, a result of the automation process may be determined and presented to the user. In some exemplary embodiments, the result may be determined based on one or more operations defined in the automation process, based on a configuration for presenting the result as defined on Step 150, based on outputs from one or more LLM sessions, or the like. For example, one or more rules may be defined and used for performing a post-processing stage of a plurality of outputs of operations defined in the automation process, and the output of the post-processing stage may be presented to the user. In some cases, post-processing stage may generate a result that indicates the output of the LLM, that comprises a portion of the output from the LLM, that comprises the entire output from the LLM, or the like.

In some exemplary embodiments, the result may be presented over the GUI, thereby assisting the user with performing a target operation, e.g., a digital task. In some exemplary embodiments, the result may be presented over the GUI of the third-party application according to the defined configuration, according to a target location for the presentation, or the like. For example, the result may be concatenating into existing fields in the GUI, may replace text in existing fields in the GUI, may be presented within a widget overlaid over the GUI and not defined by the GUI, or the like.

Figure 2:
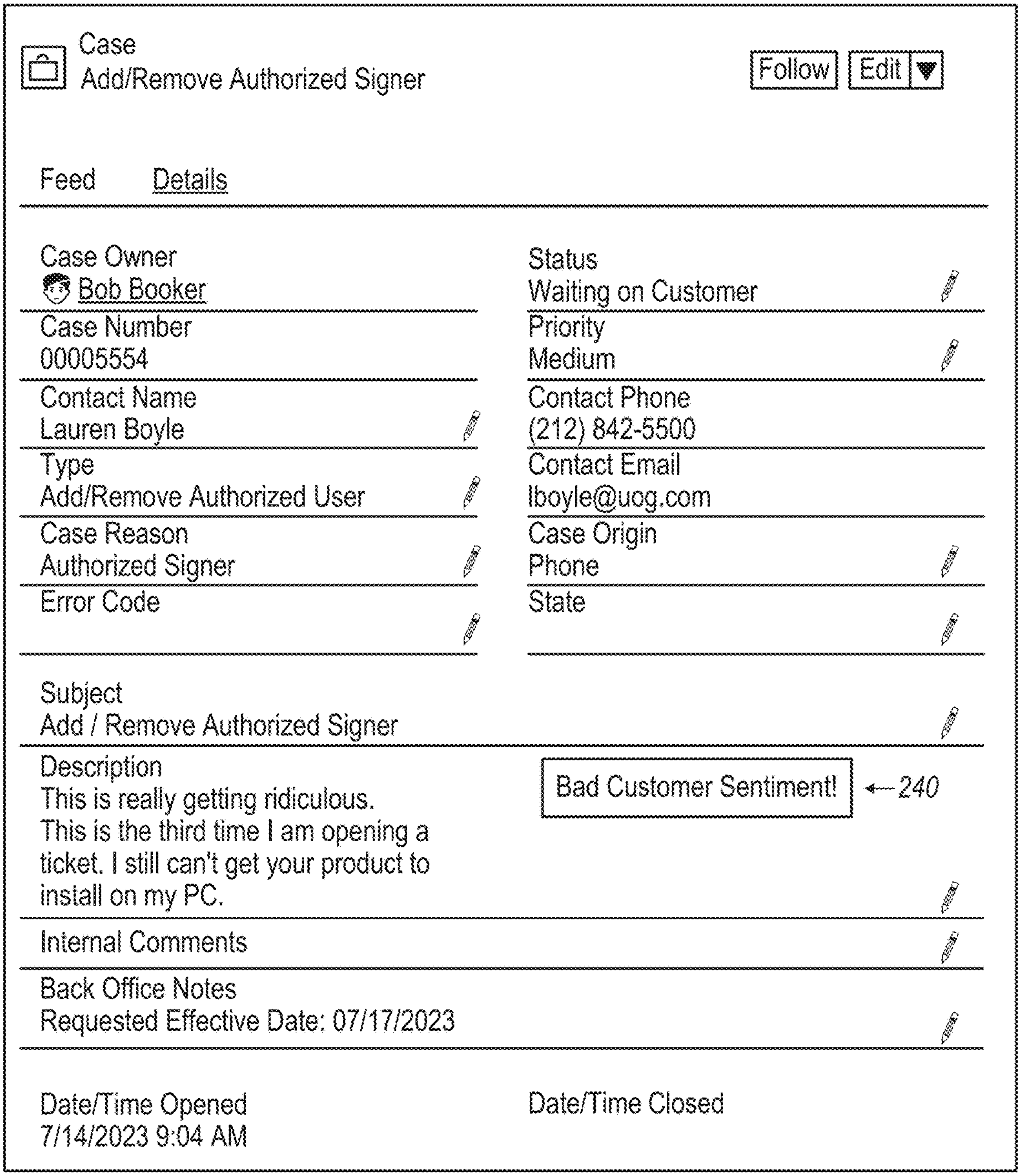
FIG. 2 shows an exemplary widget execution, in accordance with some exemplary embodiments of the disclosed subject matter.

Referring now to FIG. 2 showing an exemplary widget execution, in accordance with some exemplary embodiments of the disclosed subject matter.

In some exemplary embodiments, as depicted in FIG. 2, a Support Ticket 200 may be rendered as a page of third-party application, executed on a user device of a user, e.g., a support agent. In some exemplary embodiments, Support Ticket 200 may comprise a ticket submitted by a customer of an organization, which is intended to be reviewed by a support agent of the organization, e.g., the user. For example, Support Ticket 200 may indicate that the customer is not happy with a product of the organization.

In some exemplary embodiments, in order to assist the support agent with handling Support Ticket 200, analyzing text of Support Ticket 200, or the like, an admin user may define one or more widgets for performing one or more text analysis tasks. For example, via a DAP, the admin user may define a widget configured to automatically identifying a sentiment of a customer and alerting the support agent in case of an extremely bad sentiment. In some exemplary embodiments, the widget may be defined to detect an event, e.g., a description field with text being visible, a URL of a support ticket being visible, or the like. In some exemplary embodiments, the widget may be configured to, in response to the event, execute an automation process with source data including the text in the "Description" field of the form. In other cases, the source data may include any other text in the GUI, e.g., text from an element that holds the entire discussion thread, text from one or more portions of the form, or the like.

In some exemplary embodiments, as part of the automation process, the widget may be configured to automatically call an LLM with the source data, without user interactions or trigger events. For example, the prompt to the LLM may state: "Provide me the sentiment of the following text. The result should be a number from 1 to 10 where 1 is a very bad sentiment and 10 is a very good sentiment". In other cases, the widget may be configured to automatically call an LLM with any other prompt, such as using a prompt that states: "please specify if the input-text implies that a customer is frustrated. Return an example quote from the text where frustration is demonstrated in JSON format {is_frustrated: boolean, example_quote: string}"), where the return is_frustrated variable is required to be TRUE to display the element". In some exemplary embodiments, the widget may process the output from the LLM, e.g., during a post-processing stage, and determine whether the output complies with one or more conditions. For example, in case the result from the LLM indicates a negative sentiment, e.g., in case the LLM's score of the text is less than a threshold defined by the admin user, an identification event for presenting a widget may be determined to be complied with, detected, or the like.

In some exemplary embodiments, in response to the identification event, the widget may be presented to the user. In some cases, the widget may comprise an alert, such as an alert icon presented in a tooltip that is configured to raise the attention of the support agent to the bad sentiment. In some cases, the widget may comprise a launcher, which may be configured to perform a second automation process in response to a trigger event, e.g., in response to a user selection of the widget.

In some exemplary embodiments, the widget may indicate the output from the LLM, the second automation process, both, or the like. For example, Widget 240 may present an alert indicating to the support agent that the customer sentiment is negative, e.g., by including a red text string stating "Bad Customer Sentiment!", or any similar text string having a similar semantic meaning. In some cases, an alerting indication may be configured to not match the layout of the page (e.g., in order to be more salient), to have salient colors and shape, or the like. In other cases, the widget may be presented in a manner that matches the layout of the underlying application.

In some exemplary embodiments, in case Widget 240 is selected or clicked by the user, one or more second automation processes may be performed. For example, the same LLM may be invoked again to provide guidance to the user on handling the situation, to provide a suggested response to the negative support ticket, to provide advice for answering the negative support ticket, or the like, e.g., according to a prompt defined by the admin user. In other cases, any other LLM or AI model may be invoked.

In some exemplary embodiments, the result of the second automation process may be presented in one or more GUI elements, such as a tooltip, a popup window, an existing GUI element, or the like. In some exemplary embodiments, the result of the second automation process may incorporate the output from the LLM, portion thereof, indication thereof, or the like. In some cases, the LLM output may indicate a presentation configuration for the result. For example, the LLM output may indicate that the result, e.g., the guidance to the support agent, may be presented by navigating or scrolling to a target position in the GUI, navigating to specified text in LLM response, or displaying the result in any other way.

Figure 3A:
FIG. 3A shows an exemplary execution of multiple widgets, in accordance with some exemplary embodiments of the disclosed subject matter.

Referring now to FIG. 3A showing an exemplary execution of multiple widgets, in accordance with some exemplary embodiments of the disclosed subject matter.

In some exemplary embodiments, Support Ticket 300 may correspond to Support Ticket 200 (FIG. 2), and may be rendered in a user device of a user. For example, the user may comprise a support agent.

In some exemplary embodiments, in order to assist the support agent with handling Support Ticket 300, an admin user may define a plurality of widgets for performing a respective plurality of text analysis tasks, text generation tasks, or the like. For example, the admin user may define a sentiment widget, e.g., Widget 340, which may correspond to Widget 240 (FIG. 2), and may be configured to be presented only when a sentiment in Support Ticket 300 is negative, is below a threshold, or the like.

In some exemplary embodiments, in addition to Widget 340, the admin user may define a summarizing widget, e.g., Widget 310. In some exemplary embodiments, Widget 310 may be configured to summarize a long thread of support tickets, a single support ticket, quarterly review goals, deal statuses, expense reports, sales processes, or the like. In some exemplary embodiments, Widget 310 may be configured to, in response to an identification event, present an indication of the summarizing functionality over a GUI, such as the statement: "Summarize the ticket description". For example, the identification event may comprise an automatic identification of the GUI as a support ticket, an automatic identification of the "Description" field, an automatic identification of a URL matching a support ticket platform (e.g., in a whitelist), or the like. In some exemplary embodiments, Widget 310 may be defined to match a GUI element, e.g., the "Description" field of the form. In such cases, Widget 310 may be configured to be presented adjacently to the "Description" field, as depicted in FIG. 3A.

In some exemplary embodiments, Widget 310 may be defined to invoke one or more automation processes in response to a trigger event. For example, in case Widget 310 is selected or clicked by the user, an automation process may be performed. For example, executing the automation process may comprise invoking an LLM to summarize text from source data. In some exemplary embodiments, Widget 310 may be defined to process, as its source data, the text in the "Description" field of the form, selected text, displayed text visible in the GUI, all text in a rendered page, or the like. For example, the prompt to the LLM may state: "Please summarize the following text into up to five bullet points".

In some exemplary embodiments, a result of the automation process, e.g., including the output from the LLM, may be presented in one or more GUI elements, such as a tooltip, window, popup element, textbox, chat widget, or the like. For example, the output may be presented in Element 330 depicted in FIG. 3B. In some cases, instead or in addition to presenting the result in a GUI element, portions of the text in the page that correspond to the summary may be highlighted.

In some exemplary embodiments, in addition to Widgets 340 and 310, the admin user may define a solution suggesting widget, e.g., Widget 320. For example, Widget 320 may be defined similarly to Widget 310, on the same or different source data, but instead of summarizing the text, may be configured to utilize the LLM in order to suggest a solution to a problem posed by the "Description" field of the form. In some cases, Widget 320 may be enabled to perform tasks on behalf of the user, such as by drafting a suggested answer to the support ticket. For example, the output may be presented in Element 302 depicted in FIG. 3C.

Figure 3B:
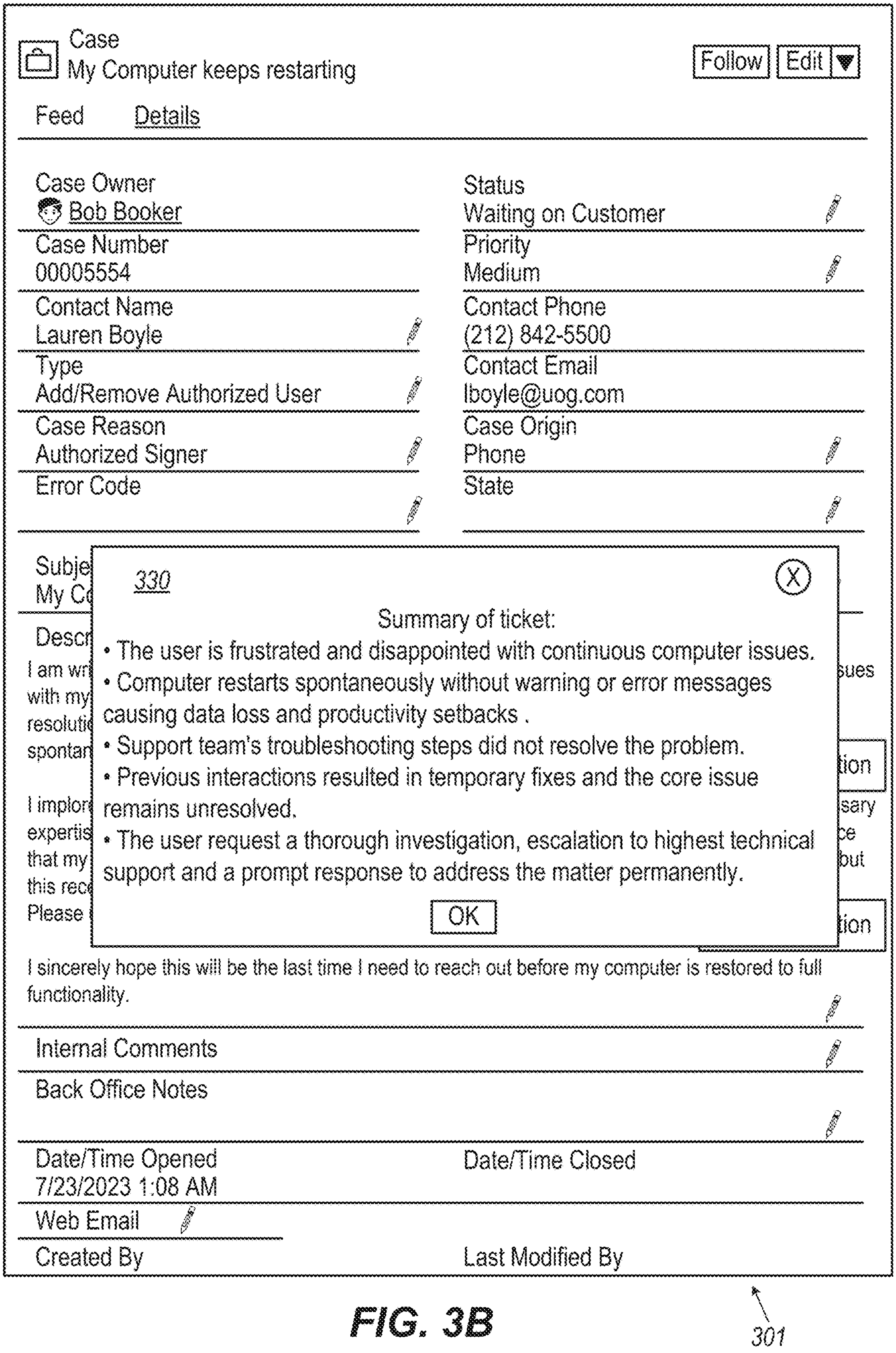

Referring now to FIG. 3B showing an exemplary presentation of a result, in accordance with some exemplary embodiments of the disclosed subject matter.

In some exemplary embodiments, outputs from LLMs may be presented in one or more GUI elements. For example, after a user selects to Widget 310, an automation process defined by Widget 310 may be invoked, causing one or more LLM calls to be performed, and an output from the LLM may be presented in Element 330, which may constitute a dialog box, a pop-up message, or the like, overlaid above the GUI of the application. In some exemplary embodiments, the text in Element 330 may comprise a summary of the "Description" field of the support ticket, as summarized by the LLM.

Referring now to FIG. 3C showing an exemplary presentation of a result, in accordance with some exemplary embodiments of the disclosed subject matter.

In some exemplary embodiments, outputs from LLMs may be presented in one or more GUI elements. For example, after a user selects to Widget 320, an automation process defined by Widget 320 may be invoked, causing one or more LLM calls to be performed, and an output from the LLM may be presented in Element 302, which may constitute a dialog box, a pop-up message, or the like, overlaid above the GUI of the application. In some exemplary embodiments, the text in Element 302 may comprise a suggested solution to a problem described in the "Description" field of the support ticket, as suggested by the LLM. In some cases, the solution may or may not be determined based on a content source, such as a private content source of the third-party application, which may be inquired or accessed by the LLM.

Figure 4:
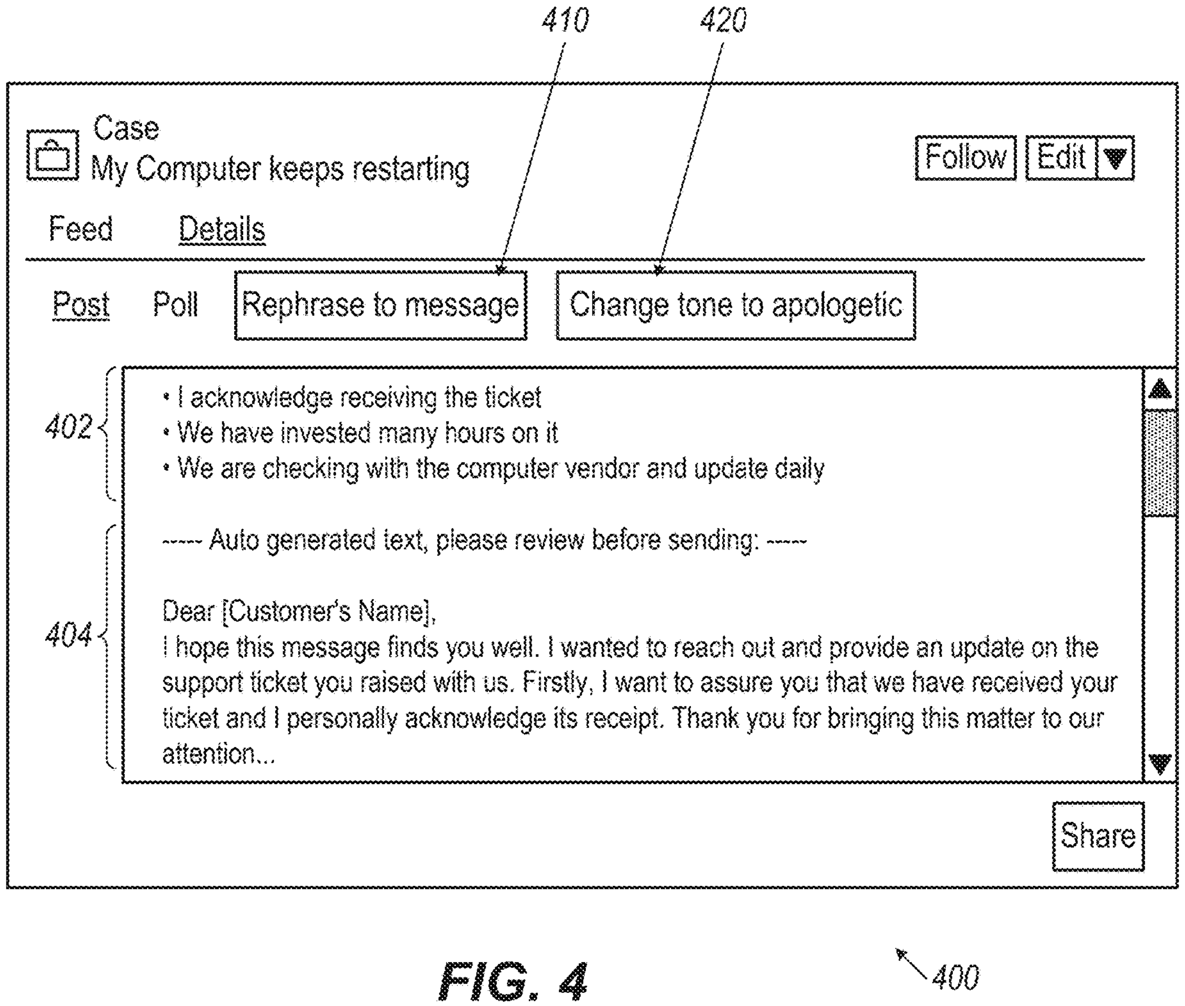
FIG. 4 shows an exemplary execution of multiple widgets, in accordance with some exemplary embodiments of the disclosed subject matter.

Referring now to FIG. 4 showing an exemplary execution of multiple widgets, in accordance with some exemplary embodiments of the disclosed subject matter.

In some exemplary embodiments, as part of the assistance layer, text generation tasks may be supported by widgets defined by an admin user. In some exemplary embodiments, widgets may be configured to assist users with generating and drafting text. For example, Bullet Points 402 of Draft 400 may represent a drafted email, communication, or similar content authored by a user such as a support agent. In some cases, Bullet Points 402 may be crafted as a reply to a support ticket such as Support Tickets 200 (FIG. 2) and 300 (FIG. 3). In other cases, Bullet Points 402 may be composed in reaction to various events, texts, or scenarios, or as an initial message not tethered to a prior correspondence.

In some exemplary embodiments, in order to assist the support agent with composing the message, an admin user may define one or more widgets for performing one or more text generation tasks. For example, via a DAP, the admin user may define Widget 410 for rephrasing bullet points into cohesive continuous text suitable for sending, and Widget 420 for changing the tone of the user's message.

In some exemplary embodiments, Widget 410 may be presented, in response to an identification event, as an indication of the respective automation process, such as: "Rephrase to message". In some exemplary embodiments, in response to a trigger event, such as a user selection of Widget 410, an LLM may be executed with its source data being Bullet Points 402, alone or in addition to one or more text portions of the GUI. For example, the prompt to the LLM may comprise: "Take the following text and transform it into a continuous text that can be sent to the recipient. The produced text should not be more than 100 words".

In some exemplary embodiments, the result of the automation process may be presented to the user in one or more defined elements, configurations, positions, or the like, such as in as text concatenated to Bullet Points 402. In some exemplary embodiments, the result of the automation process may incorporate the output from the LLM, an indication thereof, a portion thereof, or the like. For example, the LLM may output Automatically Generated Text 404, and Widget 410 may concatenate the text to Bullet Points 402. In other cases, Automatically Generated Text 404 may replace Bullet Points 402, or may be presented in any other way.

In some cases, the result of the automation process may comprise one or more portions not including the output from the LLM. For example, in addition to Automatically Generated Text 404, the result of the automation process may comprise one or more static instructions such as an instruction to review Automatically Generated Text 404 before submitting the response. For example, when presenting LLM-generated text, widgets may be configured to inform users that the text should be reviewed and enable the user to manually review and approve the automatically generated text.

As another example, the admin user may define Widget 420 for changing the tone of Bullet Points 402, changing the tone of Automatically Generated Text 404, changing the tone of Draft 400, or the like. In some cases, Widget 420 may be presented in response to an event, such as an identification event. In some cases, Widget 420 may be presented as a suggestion to change the current tone to one or more tones such as an apologetic tone, defiant tone, formal tone, informal tone, professional tone, casual tone, or the like. In some exemplary embodiments, Widget 420 may be displayed as an indication of the respective automation process, such as: "Change tone to apologetic".

In some exemplary embodiments, in response to a trigger event of Widget 420, such as a user selection of Widget 420, an LLM may be executed with defined source data. For example, the source data may be defined as including selected text that is selected by the user, all text in the feed (e.g., both Bullet Points 402 and Automatically Generated Text 404 if Widget 410 was already activated, only Bullet Points 402 if Widget 410 was not activated), Draft 400, or any other text. In some cases, the source data of Widgets 410 and 420 may differ or be identical. For example, the prompt to the LLM may comprise: "Convert the following text to sound more apologetic".

In some exemplary embodiments, the result of the automation process may be presented to the user in one or more defined elements, configurations, positions, or the like, such as in as text concatenated to Bullet Points 402, text concatenated to Automatically Generated Text 404, text concatenated to Draft 400, text replacing all the previous text in the feed, text replacing Draft 400, or the like. In some cases, the result may be displayed in a GUI element that is not part of the target digital system, of the underlying application, or the like.

Figure 5A:
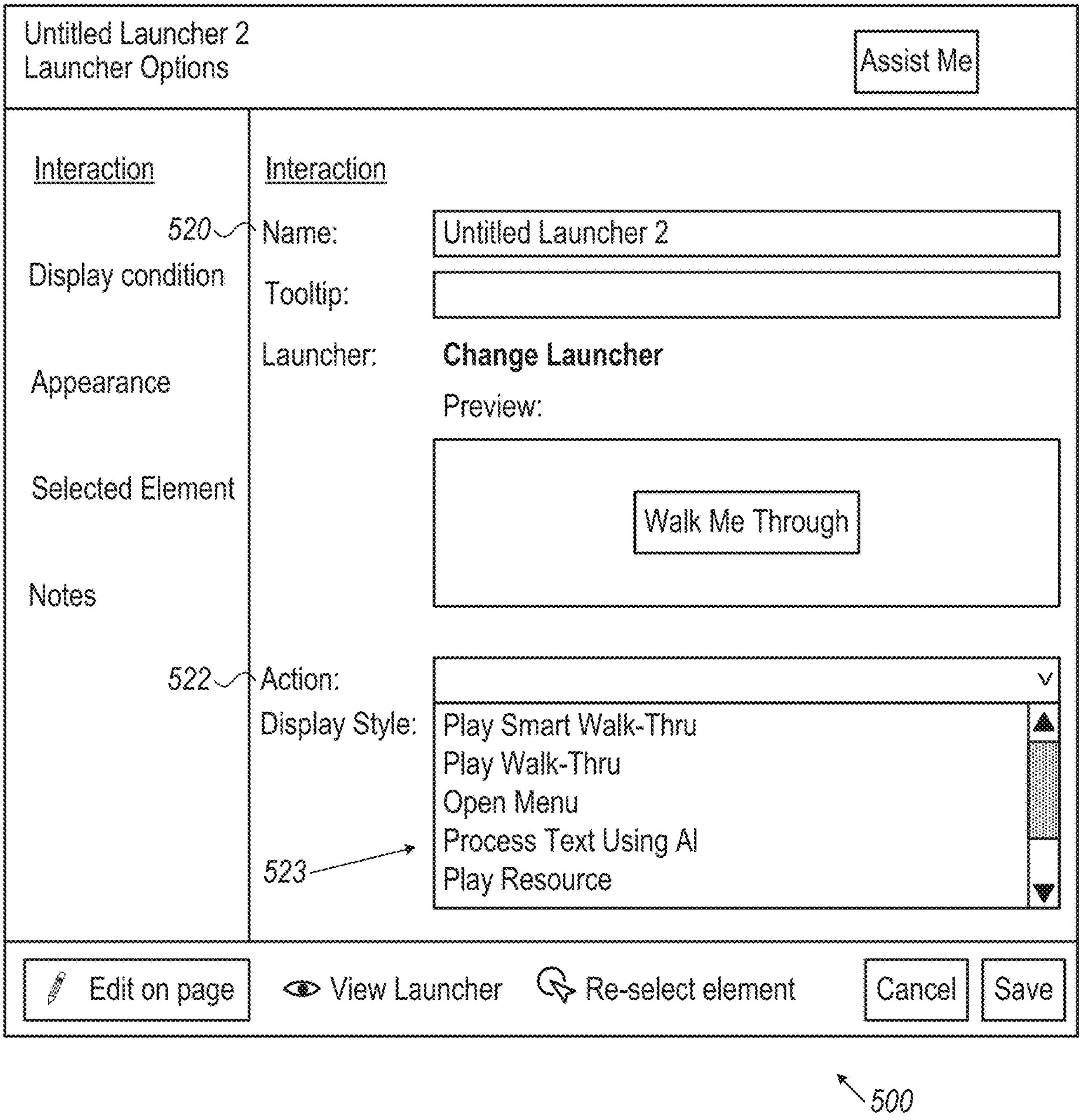
FIGS. 5A-5E show exemplary widget setups, in accordance with some exemplary embodiments of the disclosed subject matter.

Referring now to FIG. 5A showing a widget setup, in accordance with some exemplary embodiments of the disclosed subject matter.

In some exemplary embodiments, in order to setup a widget to perform one or more text generation tasks, text analysis tasks, or the like, an admin user may define various settings, configurations and properties of the desired widget via one or more user interface windows, e.g., via User Interface 500. For example, the admin may customize the behavior and appearance of the widget according to preferences or policy requirements of a specific organization, a third-party system over which the widget is configured to be executed, or the like.

In some exemplary embodiments, defining the settings of the widget may comprise defining an interaction of the widget, e.g., an automation process thereof, defining display conditions of the widget, e.g., an identification event, defining appearance configurations for showing the widget and/or the result of the automation process, defining a GUI element that should be matched to the widget, or the like.

In some exemplary embodiments, via User Interface 500, the admin user may define a name of a widget such as a launcher, e.g., preferably indicating the intended functionality of the widget. For example, the admin user may insert the name to Field 520 via a keyboard, a touchscreen, a vocal command, or the like.

In some exemplary embodiments, the admin user may define the interaction of the widget by defining one or more interactions or automation processes that are configured to be performed by the widget. As depicted in FIG. 5A, the field Action 522 enables the user to select a desired type of automation process from a list of possibilities. In some exemplary embodiments, the list may comprise heuristic-based processes, LLM-based processes, or the like. For example, an LLM-based process in the list may comprise Process 523, named: "Process text using AI", or any similar name. In some exemplary embodiments, LLM-based processes may comprise performing text generation tasks, text analysis tasks, or the like, while heuristic-based processes may comprise playing a walkthrough, rendering a resource such as a media file, or the like. For example, heuristic-based processes may be defined based on non-LLM rules such as validation rules, custom rules, rules defined using regular expression, rules defining syntactical constraints, or the like.

In some exemplary embodiments, the admin may select a desired text generation task, text analysis task, or the like, from a list of preconfigured tasks. For example, available text generation tasks may comprise a summarizing task, a "change tone" task, a task of transforming bullet points to text task, or the like. As another example, an available text analysis task may comprise a sentiment analysis task. In some exemplary embodiments, in case a selected automation process is not sufficient for the intended functionality of the admin, the admin may customize the automation process manually, such as by adjusting a defined prompt to the LLM, adjusting one or more properties of the prompt, adjusting the source data, or the like.

In some exemplary embodiments, the admin user may define, for an automation process of the widget, source data to be processed by the automation process (not depicted). For example, the source data may comprise data of a specified element, user input to a specified element, selected text, all text in a display, or the like. In some exemplary embodiments, the admin user may or may not couple the widget to a specific GUI element, from which source data may be obtained and processed by the automation process.

Figure 5B:
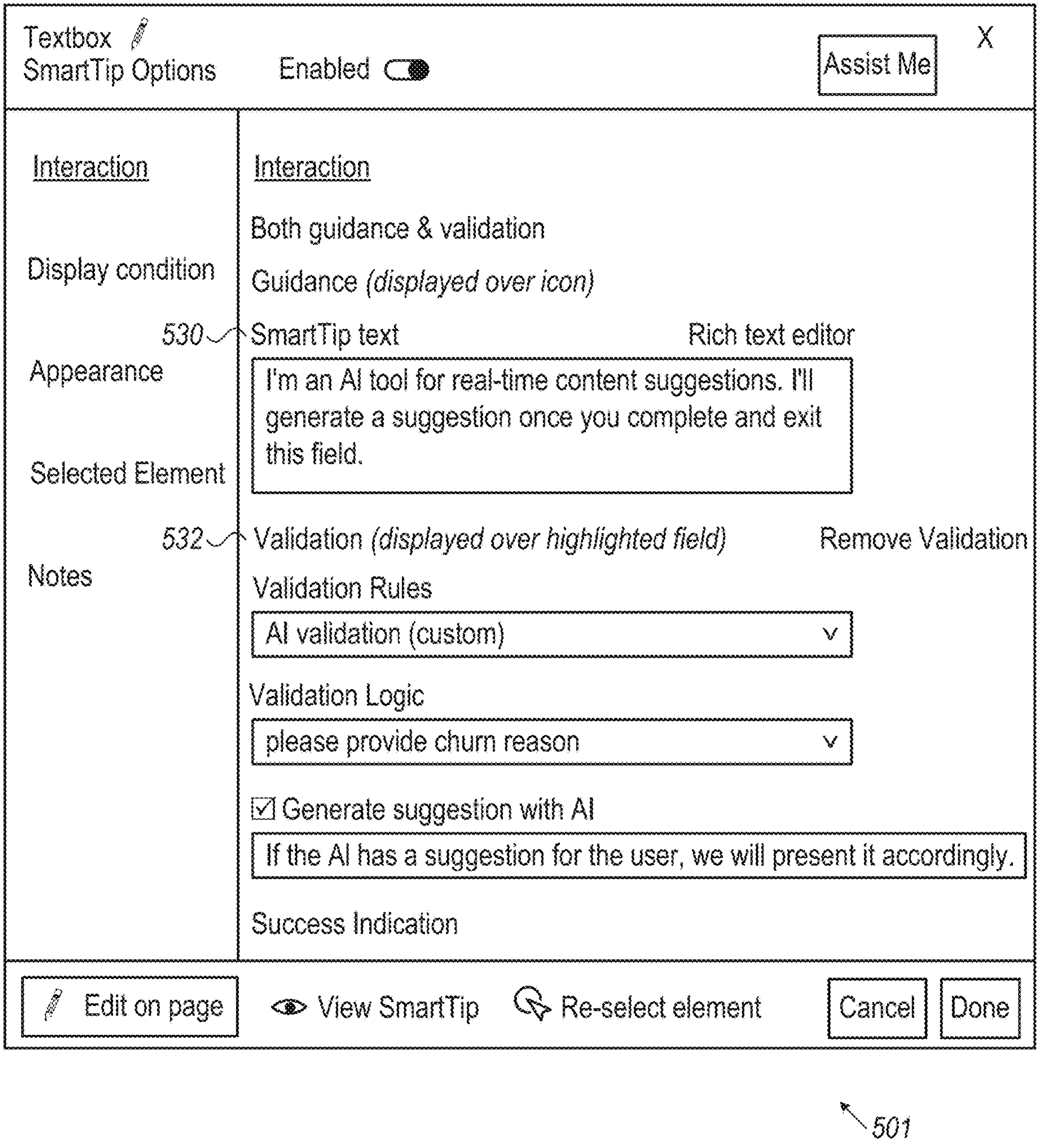

In some exemplary embodiments, defining the settings different DAP building blocks, such as tooltip widgets, may be performed similarly, such as according to FIG. 5B.

Referring now to FIG. 5B showing a widget setup, in accordance with some exemplary embodiments of the disclosed subject matter.

In some exemplary embodiments, defining the settings of the widget such as a tooltip may be performed similarly to FIG. 5A, and may comprise defining an interaction of the widget, e.g., an automation process thereof, defining display conditions of the widget, e.g., an identification event, defining appearance configurations for showing the widget and/or the result of the automation process, defining a GUI element that should be matched to the widget, or the like.

In some exemplary embodiments, via User Interface 501, the admin user may define the interaction of the widget by defining one or more interactions or automation processes that are configured to be performed by the widget, e.g., two automation processes. As depicted in FIG. 5B, a tooltip may be defined to include a Guidance Field 530, which may be configured to generate guidance for filling out a field using an LLM session, and a Validation Field 532, which may be configured to validate user inputs to the field using heuristic-based processes, LLM-based processes, or the like.

For example, an identification event for Guidance Field 530 may comprise identifying that the user provided input to a defined field, while Validation Field 532 may always be presented, but may change color based on a validation status of the input. For example, upon a trigger event associated with Guidance Field 530, e.g., a user hovering over his input, an LLM may be called and instructed to provide guidance for improving the user input, providing suggestions of better user input, or the like, such as according to a defined policy.

In some cases, Validation Field 532 may initially present a non-valid cue, such as a red dot, and, upon identifying a trigger event associated with Validation Field 532, such as some input being provided to the coupled field, the tooltip may call an LLM to determine whether the input is valid, e.g., according to a defined customer policy. The LLM may be invoked continuously, in response to a user hovering or selecting a widget, or the like. In some exemplary embodiments, in case the LLM indicates that the user input complies with a policy, is proper, or the like, the cue may be modified to indicate that the input is valid. In other cases, a validation status may be indicated in any other way, using any other DAP building block, widget, layout adjustment, overlay, or the like.

Figure 5C:
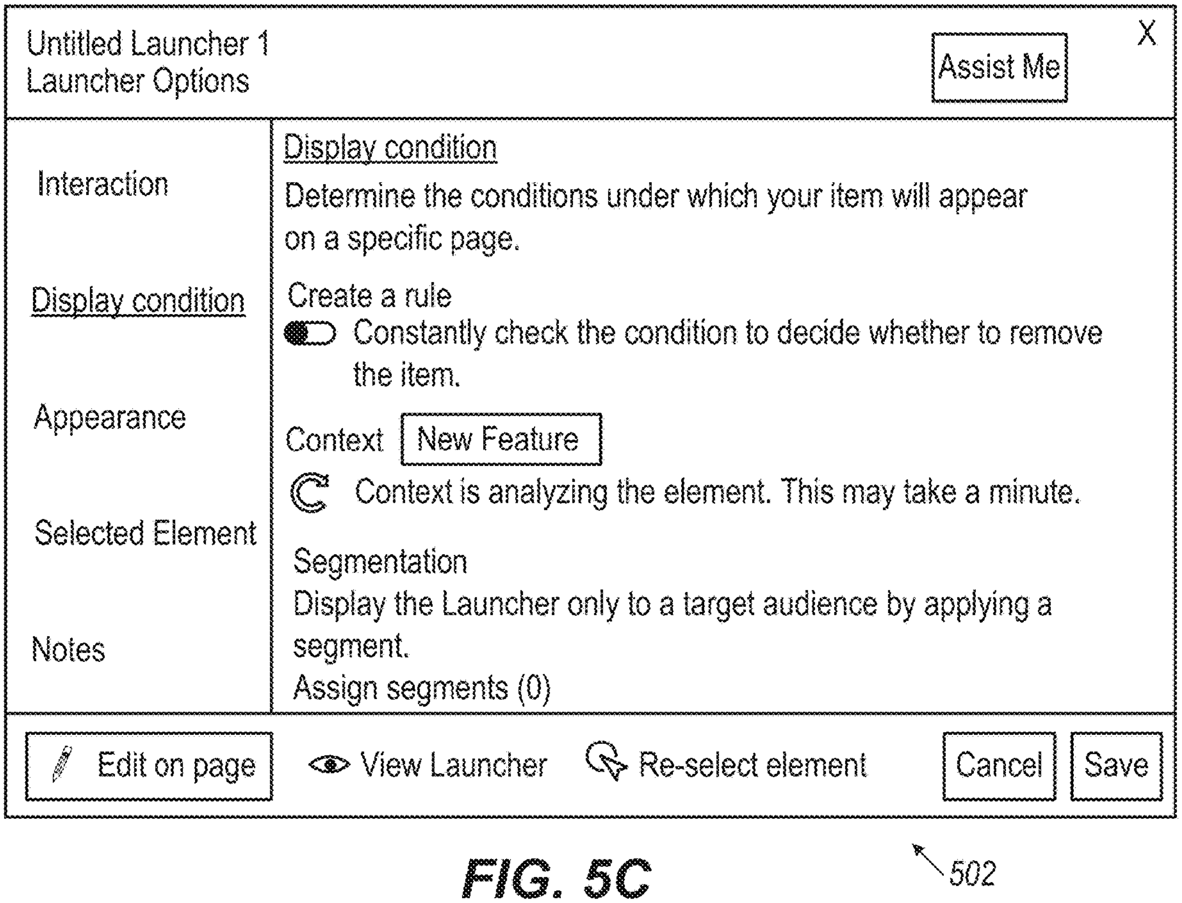

In some exemplary embodiments, after the automation processes of a widget are set, such as according to FIG. 5A or 5B, display conditions for the widget may be defined, e.g., according to FIG. 5C.

Referring now to FIG. 5C showing a widget setup, in accordance with some exemplary embodiments of the disclosed subject matter.

In some exemplary embodiments, the admin user may define display, via User Interface 502, conditions of a widget such as a launcher, a tooltip, or the like. In some exemplary embodiments, the display conditions may comprise an identification event, which, when identified, should cause the widget to be presented to the user. For example, the widget may be configured to be displayed when the display conditions are met, e.g., based on the context of the GUI displayed to the user, detected elements, detected user interactions of one or more types, or the like.

Figure 5D:
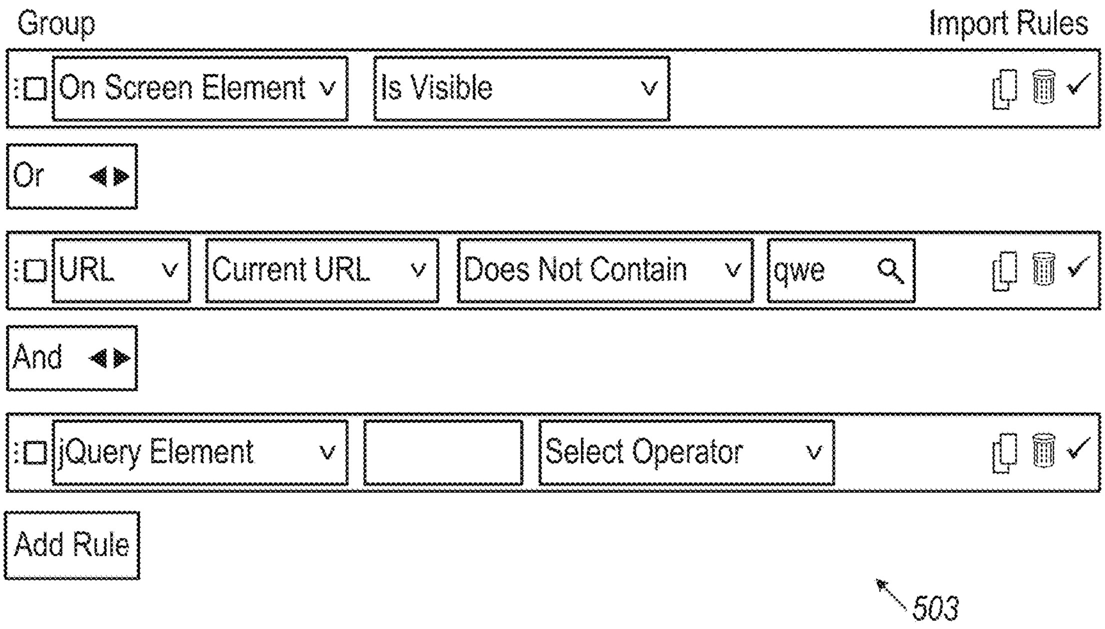

In some exemplary embodiments, the widget may be configured to be displayed in accordance with one or more context-based rules, e.g., according to FIG. 5D. For example, as depicted in FIG. 5D, a context of a rendered page may be analyzed to determine whether or not one or more context-based rules are complied with. In some exemplary embodiments, context-based rules may be defined based on a URL of the rendered page complying with one or more conditions, an on-screen element complying with one or more conditions, a jQuery element complying with one or more conditions, user data provided by the user complying with one or more conditions, or the like.

For example, as depicted in FIG. 5D, the admin user may define display, via User Interface 503, a first context-based rule defining that a specified GUI element must be visible, a second context-based rule defining that the page URL may not comprise a specified text string, and a third context-based rule defined with respect to a jQuery element. In some exemplary embodiments, any other number of context-based rules may be defined as the identification event. In some cases, the relationship between context-based rules may be defined by the admin user, such as by determining a logical 'or' relationship between certain rules (requiring one of the rules to be complied with), a logical 'and' relationship between certain rules (requiring both rules to be complied with), or the like, such as in case the entire set of rules is complied with, the widget will be presented to the end user.

Figure 5E:
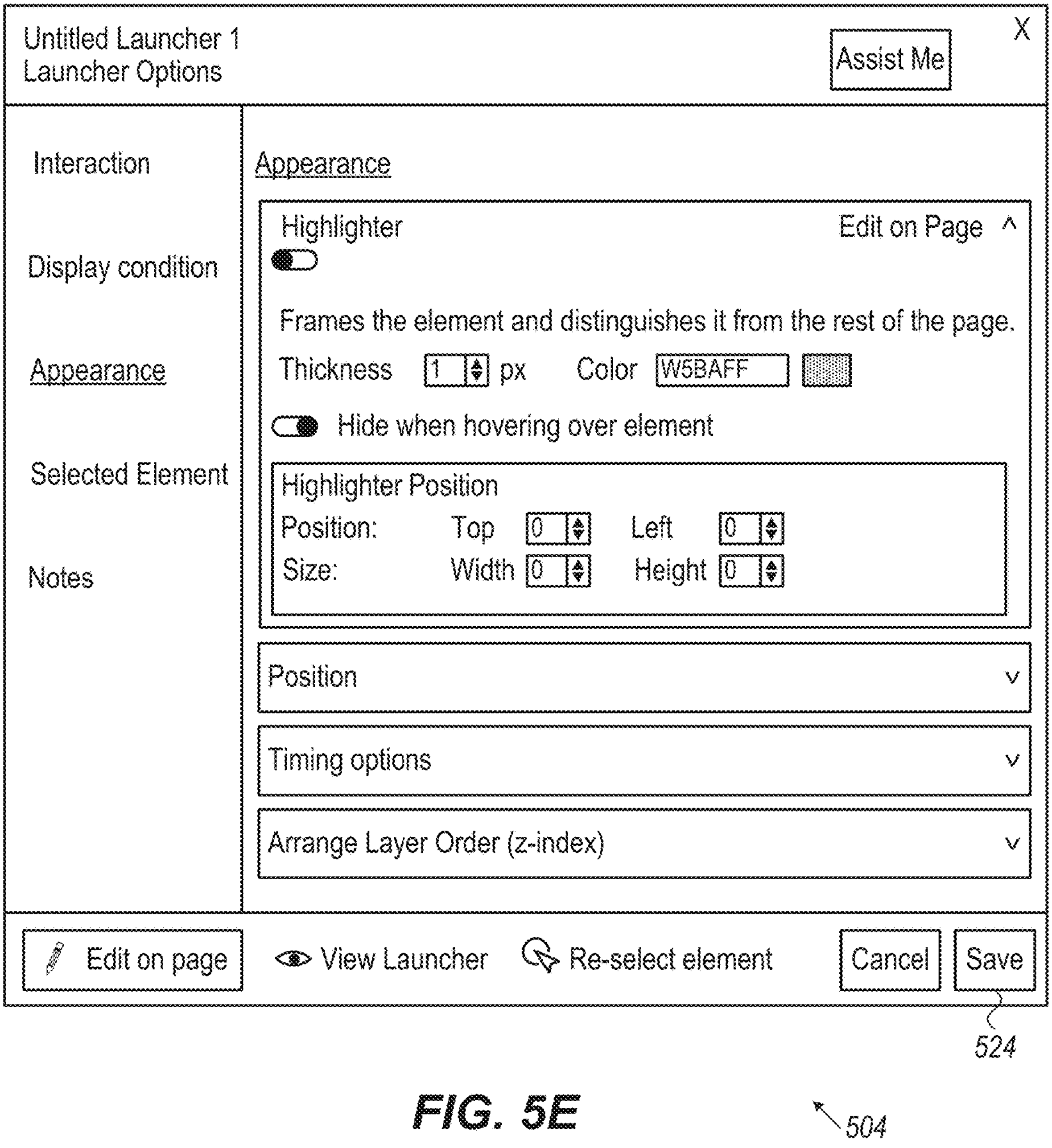

In some exemplary embodiments, after the automation processes of a widget and the identification event are set, such as according to FIGS. 5A-5D, the appearance configurations of the widget may be defined, e.g., according to FIG. 5E.

Referring now to FIG. 5E showing a widget setup, in accordance with some exemplary embodiments of the disclosed subject matter.

In some exemplary embodiments, the admin user may define display, via User Interface 504, the appearance configurations of the widget, the appearance configurations of results of the automation process, or the like. For example, appearance configurations may define a position of the widget, a text string presented by the widget, a color or other visual effects of the text string, an image presented by the widget, a different GUI element presented by the widget, or the like. As another example, the appearance configurations may define an element in which results from the automation process should be presented, a layout change configured to present results from the automation process, or the like.

In some exemplary embodiments, as depicted in FIG. 5E, the appearance configurations of the widget may define whether or not the widget and/or result should be highlighted compared to the GUI, and visual properties of the widget and/or result such as the color thereof, a thickness thereof, a position thereof, interaction settings thereof, or the like. For example, the appearance configurations of the widget may define trigger events of the automation process.

In some exemplary embodiments, the appearance configurations of the widget may define how a result of the automation process should be presented. For example, the result may be configured to be concatenated to a text field, to replace text in a text field, to replace an image with a second image, to change a layout of the GUI, to display a widget as an overlay over the GUI, or the like.

In some exemplary embodiments, after the admin user defines the settings of the widget, the admin may save the configurations, e.g., using a Save 524 button or in any other way, thereby generating a record of the desired widget and enabling to execute the widget over a third-party application, system, or the like, by end devices. For example, a software agent at the end devices may obtain defined widgets and execute them.

Figure 6:
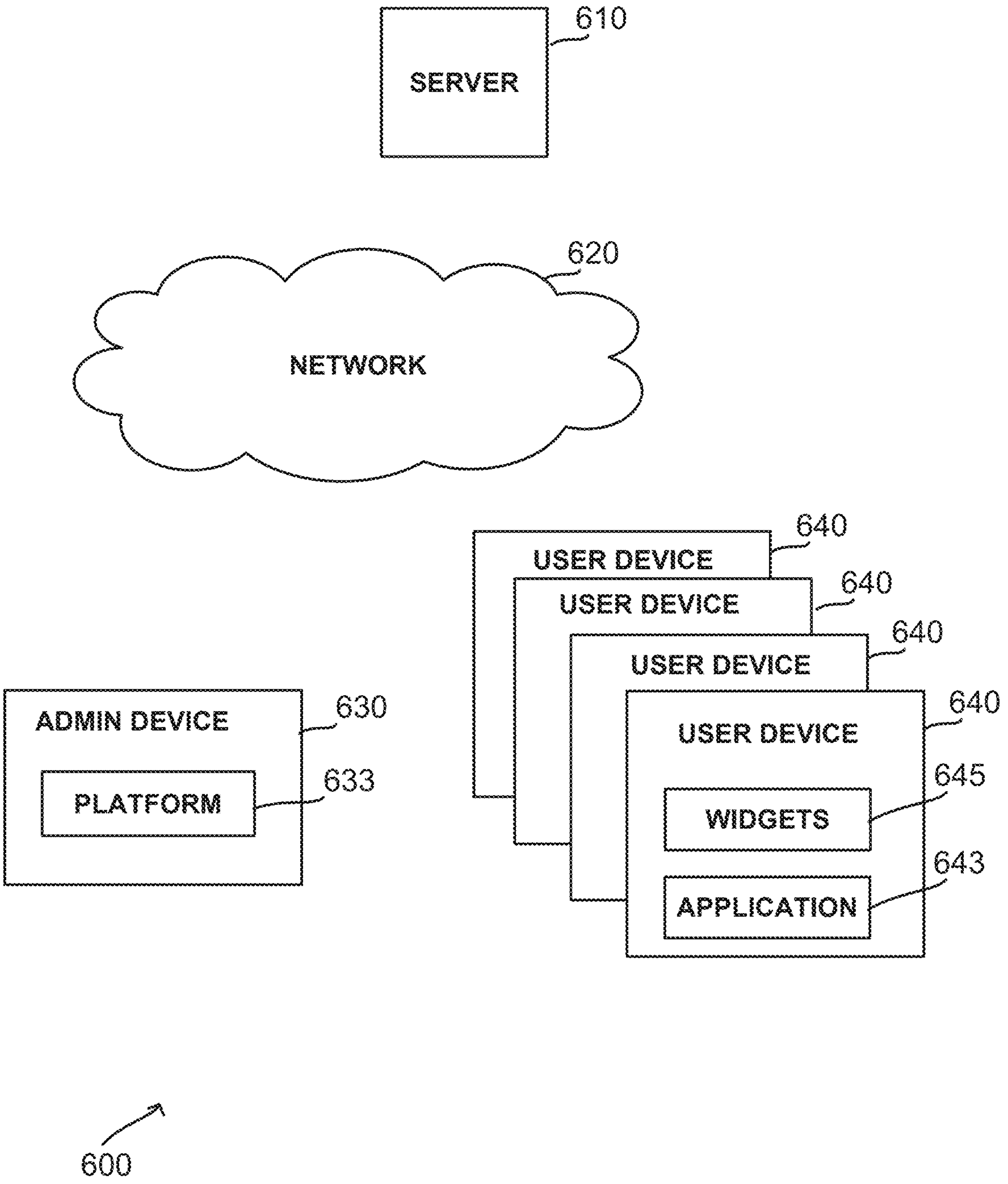
FIG. 6 shows a schematic illustration of an exemplary environment and architecture in which the disclosed subject matter may be utilized, in accordance with some exemplary embodiments of the disclosed subject matter.

Referring now to FIG. 6 showing a schematic illustration of an exemplary environment, in accordance with some exemplary embodiments of the disclosed subject matter.

In some exemplary embodiments, Environment 600 may comprise a plurality of User Devices 640. User Devices 640 may comprise Personal Computers (PCs), stationary computers, tablets, smartphones, or the like, of respective end users. User Devices 640 may be connected to a Computerized Network 620, such as a Wide Area Network (WAN), a Local Area Network (LAN), a wireless network, the Internet, an intranet, or the like.

In some exemplary embodiments, User Devices 640 may deploy and execute a third-party application, program, or the like, e.g., Application 643. For example, Application 643 may comprise a SALESFORCE™ application, Zendesk™, or the like. In some exemplary embodiments, Application 643 may comprise web page, a web application, a browser extension, a mobile application, a desktop application, or the like. In some exemplary embodiments, Application 643 may display to an end-user one or more screens, constituting a GUI, which may comprise one or more GUI elements. For example, User Devices 640 may execute a platform tailored to specific industries, such as for customer support, and the end users using User Devices 640 may be support agents. In other cases, User Devices 640 may execute any other type of application for any other purpose, industry, or the like.

In some exemplary embodiments, Environment 600 may comprise an Administrator Computer 630 (denoted "admin device"), operated by an administrator user or another user with suitable credentials and permissions. In some exemplary embodiments, Administrator Computer 630 may be connected to Computerized Network 620.

In some exemplary embodiments, Administrator Computer 630 may deploy, execute, or the like, Platform 633. For example, Platform 633 may comprise a software platform, such as a DAP platform, that is configured to enable users to define widgets for third-party applications. In some exemplary embodiments, the admin user may define, via Platform 633 of Administrator Computer 630, one or more widgets to be applied on a third-party application such as Application 643. For example, the admin user may define widgets for the same third-party application that is executed on User Devices 640, e.g., for Application 643.

In some exemplary embodiments, the widgets may be defined to have a plurality of settings, configurations, or the like, defining identification events for determining when the widgets should be presented over Application 643, automation processes for the widgets, source data for the automation processes, or the like. In some exemplary embodiments, the widgets may be defined to have one or more automation processes, configured to be executed under one or more conditions. In some exemplary embodiments, the widgets may be defined to have one or more displaying configurations, defining how and where results should be displayed, how and where the widgets themselves should be displayed, or the like. In some exemplary embodiments, the widgets may be defined to have any other configurations.

In some exemplary embodiments, defined widgets, e.g., Widgets 645, may be made available to User Devices 640. For example, Widgets 645 may be generated as a program product executable by a computer, such as, without limitations, a script, a software, a browser extension, a mobile application, a web application, a Software Development Kit (SDK), a shared library, a Dynamic Link Library (DLL), a SaaS, or the like. According to this example, Widgets 645 may be defined by the admin user and provided to User Devices 640 by sending the program product to User Devices 640. As another example, Widgets 645 may be made available to User Devices 640 via API calls to a cloud or server storing the defined widgets, e.g., Server 610. As another example, Widgets 645 may be made available to User Devices 640 via updates to an existing application or software agent deployed by User Devices 640, e.g., an agent that is configured to generate assistance layers over third-party applications such as Application 643.

In some exemplary embodiments, at least one User Device 640 may execute corresponding Widgets 645, Application 643, or the like, e.g., simultaneously. In some exemplary embodiments, User Devices 640 may execute a software agent associated with Widgets 645. For example, the software agent may be configured to acquire GUI elements appearing in GUIs of third-party applications in User Device 640, communicate the acquired data to a server such as Server 610, and apply Widgets 645 over the GUI according to the acquired data. In some cases, the software agent may correspond to one or more software agents disclosed in U.S. Pat. No. 10,620,975, entitled "GUI Element Acquisition Using A Plurality Of Alternative Representations Of The GUI Element", dated Apr. 14, 2020, which is incorporated by reference in its entirety for all purposes without giving rise to disavowment.

For example, an agent executed over User Device 640 may determine that the identification event of a widget in Widgets 645 is complied with, causing the widget to be presented. Upon identifying a trigger event, such as user selection or hovering of the widget, an automation process of the widget may be executed, such as an automation process encompassing exploitation of LLM technology. A result or output from the automation process may be presented to a user of User Device 640 according to displaying configurations of the widget, thereby assisting the user with performing a digital task.

In some exemplary embodiments, Environment 600 may comprise a Server 610, which may be connected to Computerized Network 620. Server 610 may be connected directly, indirectly, or the like, to Administrator Computer 630, to User Devices 640, or the like, such as via Computerized Network 620. In some exemplary embodiments, Server 610 and Administrator Computer 630 may or may not be implemented by the same physical device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

defining an identification event associated with a Graphical User Interface (GUI) of a page of a third-party application, the identification event indicates that a defined automation process is associated with text presented in the GUI;

defining source data associated to the automation process, the source data comprising at least a portion of the text;

defining that, in response to identifying the identification event, an indication of the automation process is configured to be presented over the GUI;

defining that, in response to identifying a trigger event, the automation process is configured to be executed, wherein executing the automation process comprises generating a prompt to a Large Language Model (LLM) engine, wherein the prompt is configured to comprise a predefined structure of a text portion and a variable portion, wherein the variable portion is configured to be replaced with the source data every invocation of the trigger event; and defining a configuration for presenting in the GUI a result, wherein the result is based on an output from the LLM engine, wherein said defining the identification and trigger events, said defining the source data, said defining the indication, said defining that the automation process is configured to be executed, and said defining the configuration are all performed via a digital adoption platform that is agnostic to the third-party application and is configured to assist end users using the third-party application.

2. The method of claim 1, wherein the source data comprises text associated to an element that is displayed in the GUI, wherein the automation process is defined to correspond to the element.

3. The method of claim 1, wherein the source data comprises selected text that is displayed in the GUI, wherein the automation process corresponds to the selected text.

4. The method of claim 1, wherein the source data comprises all text that is displayed in the GUI, wherein the automation process corresponds to the text.

5. The method of claim 1, wherein the page includes one or more fields reflecting a submission of another user, wherein the prompt is generated to instruct the LLM engine to perform a text generation task configured to assist an end user with responding to the submission.

6. The method of claim 1, wherein the page includes one or more fields reflecting a submission of another user, wherein the prompt is configured to instruct the LLM engine to perform a text analysis task analyzing text of the submission, whereby providing an end user with insights useful to handle the submission by the another user.

7. The method of claim 1, wherein a second automation process is defined for the source data, the method comprising configuring a second indication of the second automation process to be presented over the GUI in response to the identification event.

8. The method of claim 1 further comprising configuring a target location for presenting the indication of the automation process.

9. The method of claim 8, wherein the source data comprises text associated to an element that is displayed in the GUI, wherein the target location is adjacent to the element.

10. The method of claim 1 further comprising configuring a target location for presenting the result.

11. The method of claim 10 further comprising, in response to said identifying the trigger event, performing an automatic scroll of the page until reaching a displayed portion of the page that depicts the target location.

12. The method of claim 1, wherein the trigger event comprises a user interaction with the indication of the automation process.

13. The method of claim 1, wherein the indication of the automation process comprises a widget presenting a text string, wherein the text string describes the automation process, wherein the widget comprises a launcher or a tooltip, wherein the widget is not defined by the third-party application.

14. The method of claim 1, wherein the configuration of presenting the result comprises at least one of:
- updating one or more properties of the GUI based on the result;
- presenting the result in a textbox in the GUI, wherein the result is configured to be inserted into the textbox and displayed therein;
- presenting the result in the textbox, wherein the result is configured to be displayed by updating a visual characteristic of at least a portion of the textbox;
- presenting the result in a text input field, wherein the result is configured to be appended to pre-existing text in the text input field;
- presenting the result in the text input field, wherein the text input field is configured to be updated to present the result;
- presenting the result in a popup element, the popup element is configured to be displayed over the GUI, wherein the popup element is not part of the third-party application; and
- presenting the result in a chat widget, wherein the chat widget is not part of the third-party application.

15. The method of claim 14, wherein the one or more properties comprise at least one of: a color of a text element, a highlighting of a text element, and a color of a non-text element.

16. The method of claim 1, wherein the text portion of the prompt is set to comprise a background section describing a background of the automation process, and a command section comprising a request for processing the variable portion according to the automation process.

17. The method of claim 1, wherein the automation process is configured to be performed with respect to a content source, wherein the content source comprises a database or a repository, wherein the prompt to the LLM is determined based on at least a portion of retrieved data that is retrieved from the content source, wherein the retrieved data conforms to a similarity metric with respect to the source data or with respect to portion of the predefined structure of the text portion.

18. The method of claim 1 further comprising:
- determining the identification event occurring in the third-party application, the third-party application is being used by an end user;
- presenting the indication of the automation process, wherein the indication of the automation process is presented over the GUI of the third-party application;
- in response to the trigger event:
  - determining the source data;
  - generating the prompt;
  - providing the prompt to the LLM engine, whereby obtaining the result from the LLM engine; and
  - presenting the result over the GUI of the third-party application according to the configuration.

19. A method comprising:
- defining an event associated with a Graphical User Interface (GUI) of a page of a third-party application, the event indicates that a defined automation process is associated with text in the GUI;
- defining source data associated to the automation process, the source data comprising at least a portion of the text;
- defining that, in response to identifying the event, the automation process is configured to be executed, wherein executing the automation process comprises generating a prompt to a Large Language Model (LLM) engine, the prompt configured to cause the LLM engine to perform at least a portion the automation process and to provide an output, wherein the prompt is configured to comprise a predefined structure of a text portion and a variable portion, wherein the variable portion is configured to be replaced with the source data every invocation of the prompt;
- in response to determining that the output complied with one or more conditions, determining that an identification event is detected;
- defining that, in response to detecting the identification event, an indication of the output is configured to be presented over the GUI without any user interactions; and
- defining that, in response to identifying a user interaction with the indication, a second automation process is configured to be performed.

20. A method comprising:
- assisting a user with performing an operation that is based on a semantic analysis of text, the text is presented in a Graphical User Interface (GUI) of a page of a third-party application, said assisting comprises:
  - automatically detecting an occurrence of an identification event in the GUI, the identification event indicates that an automation process is associated with the text;
  - automatically determining source data for the automation process from the text;
  - in response to the identification event, presenting an indication of the automation process over the GUI;
  - in response to identifying an interaction of the user with the indication of the automation process, identifying a trigger event, the trigger event invoking an execution of the automation process, wherein the execution of the automation process comprises generating a prompt to a Large Language Model (LLM) engine, the prompt comprises the source data, wherein the prompt has a predefined structure of a text portion and a variable portion, wherein said generating the prompt comprises replacing the variable portion with the source data;
  - obtaining an output from the LLM engine, the output comprising data that corresponds to a semantic analysis of the source data; and presenting a result over the GUI, the result is based on the output, thereby assisting the user with performing the operation.

21. The method of claim 20, wherein the source data comprises at least one of: text associated to an element that is displayed in the GUI, selected text that is displayed in the GUI, and all text that is displayed in the GUI.

22. A computerized apparatus having a processor, the processor being adapted to perform the steps of:

defining an identification event associated with a Graphical User Interface (GUI) of a page of a third-party application, the identification event indicates that a defined automation process is associated with text presented in the GUI;

defining source data associated to the automation process, the source data comprising at least a portion of the text;

defining that, in response to identifying the identification event, an indication of the automation process is configured to be presented over the GUI;

defining that, in response to identifying a trigger event, the automation process is configured to be executed, wherein executing the automation process comprises generating a prompt to a Large Language Model (LLM) engine, wherein the prompt is configured to comprise a predefined structure of a text portion and a variable portion, wherein the variable portion is configured to be replaced with the source data every invocation of the trigger event; and defining a configuration for presenting in the GUI a result, wherein the result is based on an output from the LLM engine, wherein said defining the identification and trigger events, said defining the source data, said defining the indication, said defining that the automation process is configured to be executed, and said defining the configuration are all performed via a digital adoption platform that is agnostic to the third-party application and is configured to assist end users using the third-party application.

23. The computerized apparatus of claim 22, wherein a second automation process is defined for the source data, the processor is further adapted to configure a second indication of the second automation process to be presented over the GUI in response to the identification event.

24. A computerized apparatus having a processor, the processor being adapted to perform the steps of:

assisting a user with performing an operation that is based on a semantic analysis of text, the text is presented in a Graphical User Interface (GUI) of a page of a third-party application, said assisting comprises:

automatically detecting an occurrence of an identification event in the GUI, the identification event indicates that an automation process is associated with the text;

automatically determining source data for the automation process from the text;

in response to the identification event, presenting an indication of the automation process over the GUI;

in response to identifying an interaction of the user with the indication of the automation process, identifying a trigger event, the trigger event invoking an execution of the automation process, wherein the execution of the automation process comprises generating a prompt to a Large Language Model (LLM) engine, the prompt comprises the source data, wherein the prompt has a predefined structure of a text portion and a variable portion, wherein said generating the prompt comprises replacing the variable portion with the source data;

obtaining an output from the LLM engine, the output comprising data that corresponds to a semantic analysis of the source data; and presenting a result over the GUI, the result is based on the output, thereby assisting the user with performing the operation.

* * * * *